US012761920B2

(12) United States Patent
Najem et al.

(10) Patent No.: US 12,761,920 B2
(45) Date of Patent: Oct. 13, 2026

(54) ARITHMETIC COMBINATION OPERATION

(71) Applicant: Arm Limited, Cambridge (GB)

(72) Inventors: Mohamad Mathieu Najem, Sophia Antipolis (FR); Didier Martinot, Sophia Antipolis (FR); Eric Biscondi, Biot (FR)

(73) Assignee: Arm Limited, Cambridge (GB)

( * ) Notice: Subject to any disclaimer, the term of this patent is extended or adjusted under 35 U.S.C. 154(b) by 48 days.

(21) Appl. No.: 19/041,260

(22) Filed: Jan. 30, 2025

(65) Prior Publication Data

US 2026/0219887 A1 Jul. 30, 2026

(51) Int. Cl.
*G06F 9/30* (2018.01)

(52) U.S. Cl.
CPC ........ *G06F 9/30145* (2013.01); *G06F 9/3001* (2013.01); *G06F 9/30105* (2013.01)

(58) Field of Classification Search
None
See application file for complete search history.

(56) References Cited

U.S. PATENT DOCUMENTS

| | | | |
|---|---|---|---|
| 9,009,450 B2 | 4/2015 | Stephens et al. | |
| 2002/0040378 A1 | 4/2002 | Symes et al. | |
| 2005/0240870 A1 | 10/2005 | Aldrich et al. | |
| 2018/0203692 A1 | 7/2018 | Stephens | |
| 2021/0042261 A1 | 2/2021 | Milanovic et al. | |
| 2021/0389948 A1* | 12/2021 | Beu | G06F 9/30112 |

FOREIGN PATENT DOCUMENTS

| | | |
|---|---|---|
| GB | 2622581 | 3/2024 |

OTHER PUBLICATIONS

International Search Report and Written Opinion of the International Searching Authority for PCT/GB2026/050057 mailed Apr. 23, 2026, 13 pages.

* cited by examiner

*Primary Examiner* — Scott C Sun
(74) *Attorney, Agent, or Firm* — NIXON & VANDERHYE P.C.

(57) ABSTRACT

There is provided an apparatus comprising decoder circuitry, responsive to a mixed-element-combination instruction specifying one or more first registers and a one or more second registers, to trigger the processing circuitry to perform at least one arithmetic operation to combine each first element of a set of first elements from contiguous positions in the first registers with a corresponding second element of a set of second elements selected from the second registers according to the element information to generate a set of intermediate result elements, and to combine the intermediate result elements to generate a result element. A first element size of each first element is different to a second element size of each second element.

20 Claims, 15 Drawing Sheets

ARITHMETIC COMBINATION OPERATION

TECHNICAL FIELD

The present invention relates to data processing. More particularly the present invention relates to an apparatus, a method, and a computer program.

BACKGROUND

Some apparatuses are provided with processing circuitry to perform processing operations to combine one or more elements from one or more architectural registers to generate results elements. Some apparatuses support single-instruction-multiple-data (SIMD) instructions, which specify SIMD operands where each SIMD operand comprises two or more independent data elements within a single register enabling a greater number of data values to be processed in a single instruction.

SUMMARY

According to some configurations of the present techniques there is provided an apparatus comprising:

- instruction decoder circuitry configured to decode program instructions;
- processing circuitry configured to perform data processing in response to the instructions decoded by the instruction decoder;
- wherein:
- the instruction decoder circuitry is responsive to a mixed-element-combination instruction specifying one or more first architectural registers and one or more second architectural registers, to trigger the processing circuitry to perform a mixed-element-combination operation, wherein the mixed-element-combination instruction encodes element information identifying a set of elements in the one or more second architectural registers;
- the processing circuitry is configured, when performing the mixed-element-combination operation:
  - to perform at least one arithmetic operation to combine each first element of a set of first elements from contiguous positions in the one or more first architectural registers with a corresponding second element of a set of second elements selected from the one or more second architectural registers according to the element information to generate a set of intermediate result elements; and
  - to combine the set of intermediate result elements to generate a result element; and
- a first element size of each first element of the set of first elements is different to a second element size of each second element of the set of second elements.

According to some configurations of the present techniques there is provided a method of operating an apparatus comprising instruction decoder circuitry configured to decode program instructions, and processing circuitry configured to perform data processing in response to the instructions decoded by the instruction decoder, the method comprising:

- with the instruction decoder circuitry in response to a mixed-element-combination instruction specifying one or more first architectural registers and one or more second architectural registers, to trigger the processing circuitry to perform a mixed-element-combination operation, the mixed-element-combination instruction encoding element information identifying a set of elements in the one or more second architectural registers;
- with the processing circuitry:
  - performing at least one arithmetic operation to combine each first element of a set of first elements from contiguous positions in the one or more first architectural registers with a corresponding second element of a set of second elements selected from the one or more second architectural registers according to the element information to generate a set of intermediate result elements; and
  - combining the set of intermediate result elements to generate a result element,
- wherein a first element size of each first element of the set of first elements is different to a second element size of each second element of the set of second elements.

According to some configurations of the present techniques there is provided a computer program for controlling a host data processing apparatus to provide an instruction execution environment, the computer program comprising:

- instruction decoder program logic configured to decode program instructions;
- processing program logic configured to perform data processing in response to the instructions decoded by the instruction decoder program logic;
- wherein:
- the instruction decoder program logic is responsive to a mixed-element-combination instruction specifying one or more first storage structures simulating one or more first architectural registers and one or more second storage structures simulating one or more second architectural registers, to trigger the processing program logic to perform a mixed-element-combination operation, the mixed-element-combination instruction encoding element information identifying a set of elements in the one or more second storage structures;
- the processing program logic is configured, when performing the mixed-element-combination operation:
  - to perform at least one arithmetic operation to combine each first element of a set of first elements from contiguous positions in the one or more first storage structures with a corresponding second element of a set of second elements selected from the one or more second storage structures according to the element information to generate a set of intermediate result elements; and
  - to combine the set of intermediate result elements to generate a result element; and
- a first element size of each first element of the set of first elements is different to a second element size of each second element of the set of second elements.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
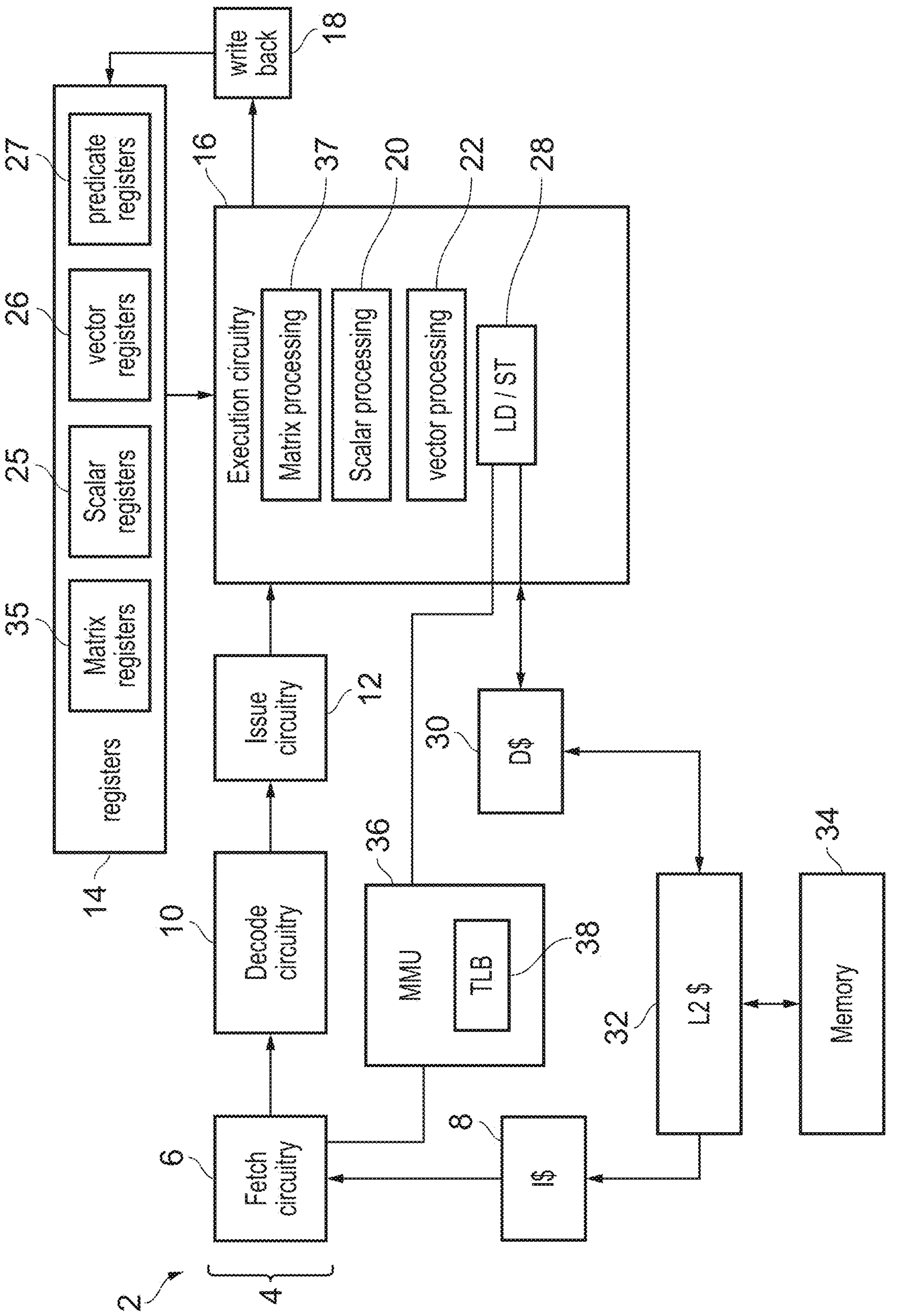
FIG. 1 schematically illustrates an apparatus according to some configurations of the present techniques.

Before discussing the configurations with reference to the accompanying figures, the following description of configurations is provided.

According to some configurations of the present techniques there is provided an apparatus comprising instruction decoder circuitry configured to decode program instructions. The apparatus comprises processing circuitry configured to perform data processing in response to the instructions decoded by the instruction decoder. The instruction decoder circuitry is responsive to a mixed-element-combination instruction specifying one or more first architectural registers and one or more second architectural registers, to trigger the processing circuitry to perform a mixed-element-combination operation. The mixed-element-combination instruction encodes element information identifying a set of elements in the one or more second architectural registers. The processing circuitry is configured, when performing the mixed-element-combination operation: to perform at least one arithmetic operation to combine each first element of a set of first elements from contiguous positions in the one or more first architectural registers with a corresponding second element of a set of second elements selected from the one or more second architectural registers according to the element information to generate a set of intermediate result elements, and to combine the set of intermediate result elements to generate a result element. A first element size of each first element of the set of first elements is different to a second element size of each second element of the set of second elements.

The instruction decoder circuitry is provided to receive a sequence of instructions and is responsive to instructions from the sequence to decode those instructions in order to control the processing circuitry to perform one or more processing operations. For example, the instruction decoder circuitry may generate one or more control signals that are routed to the processing circuitry to cause the processing circuitry to perform the processing operations specified in the instructions. Instructions that can be provided as part of the sequence of instructions, and that will be interpreted by the instruction decoder circuitry are instructions that are comprised in an Instruction Set Architecture (ISA). The ISA provides a complete set of instructions that can be used by a programmer or a compiler to control the processing circuitry to perform one or more processing tasks.

For typical SIMD instructions operating on sets of first data elements and sets of second data elements, it is normal for first data elements and second data elements to be the same size, i.e., for each element in the first set of data elements and for each element in the second set of data elements to be composed of a same number of bits of data. This is because, during typical SIMD operation, data elements pass through the processing circuitry within a number of independent lanes of vector processing with each lane processing a single element taken from the set of first elements and a single element taken from the set of second elements. As such, in order to reduce the signal pathways between lanes, it is natural to provide instructions for which the input operands are of a same size. Whilst combination operations between elements of different data size could be provided, for example, by zero- or sign-extending the smaller sized data elements, for example, using one or more further instructions, this process results in inefficiencies in terms of the number of required instructions, data storage, and the processing operations carried out.

Whilst the provision of an instruction, e.g., a single architectural instruction, in which a size of first data elements and a size of second data elements are different from one another may result in the abovementioned inefficiencies, there are a number of use cases, for example, in machine learning, where the combination of different size data elements may be beneficial. Furthermore, where one set of data elements has a different size to the other, a greater number of the smaller sized element can be packed into a given architectural register potentially increasing the element density of the smaller sized elements. The inventors have recognised that there is therefore a trade-off between the desire to use different sized data elements and the potential complexities and processing inefficiencies associated with implementing instructions that make use of such different sized data elements. The apparatus is therefore arranged to perform a mixed-element-combination instruction that specifies one or more first architectural registers and one or more second architectural registers, where the elements extracted from the first architectural registers are of a different size to the elements extracted from the second architectural registers, and that combines elements from those first and second architectural registers. The instruction decoder is responsive to receipt of the mixed-element-combination operation to perform a mixed-element-combination operation to combine elements from the first architectural register(s) and the second architectural register(s).

The mixed-element-combination instruction encodes element information identifying particular elements in the second architectural registers that are to be used in the response to the mixed-element-combination operation. Advantageously, this enables a programmer or compiler to specify specific ones of the second elements that are to be used for a given mixed-element-combination instruction providing flexibility. This added flexibility can be beneficial in terms of achieving improved efficiency in a single instance of the mixed-element-combination instruction and over multiple instances where different portions of the same architectural registers, as defined by the element information, may be combined over different occurrences of the instruction to enable multiple instructions to be carried out across the different portion specifications without having to change the data specified in the architectural registers.

As used herein, the term architectural register refers to a register that is architecturally visible, i.e., to a programmer or a compiler. As such, an architectural register can be specified as an operand location or a result location for instructions defined by the instruction set architecture. This is in contrast to a physical register which is the micro-architectural implementation of a register. In some configurations there may be a one-to-one relationship between the architectural registers and the physical registers, however, this is not always the case and in some implementations of a given architecture the number of physical registers may differ from the number of architectural registers specified by the given architecture. For example, in some configurations, the number of physical registers provided may exceed the number of architectural registers with register renaming being used to provide, for a given instruction, a mapping between architectural registers specified in that instruction and the available physical registers. This approach can be used to overcome false dependencies in program code and improve throughput. Alternatively, in some implementations of the given architecture, the number of physical registers provided may be fewer than the number of architectural registers with the contents of the physical registers being swapped out to memory when a given architectural register requires use of one of the physical registers. Furthermore, in some configurations, a given architectural registers may map to multiple different portions of a physical register file at any given point, for example, some elements of the given architectural register may map to a first physical register (or a first portion of a physical register file) and a second portion of the given architectural register may map to a second physical register (or a second portion of the physical register file). The mapping between architectural registers and the physical implementation of those registers can therefore differ significantly between different implementations of the same architecture.

The mixed-element-combination operation comprises extracting a set of first data elements from consecutive positions of the one or more first architectural registers and extracting a set of second data elements from the one or more second architectural registers. The number of first elements extracted and the number of second elements extracted are equal to one another and they are combined using an arithmetic operation to generate result elements. In particular, the first elements and the second elements are combined pair-wise with one another so that an i-th one of the first elements is combined with an i-th one of the second elements. Because the first elements are extracted from consecutive positions in the first architectural register, an order of the set of first elements is the same as the order that those elements in the first architectural register(s). On the other hand, no such restriction is placed on the elements extracted from the set of second architectural registers and the positions from which those elements are extracted is defined by the element information which is encoded in the mixed-element-combination instruction. The order of the set of second elements is determined by the element information and may therefore be different from the order in which the elements appear in the second architectural register(s). The element information may be provided in any form and may be implicit in the instruction encoding or explicitly specified as an input operand (e.g., stored in a register or specified as an immediate value).

In some configurations the processing circuitry is configured, for at least one value of the element information, to select at least one pair of second elements of the corresponding set of second elements from non-contiguous elements in the one or more second architectural registers. In other words, the processing circuitry is configured, when performing the mixed-element-combination operation, for at least one value of the element information to extract at least one pair of the set of second elements from non-contiguous positions in the second architectural register(s). The term non-contiguous positions in the second architectural register (s) refers to the positions of elements as seen at an architectural level. For example, an element in element position j of one architectural register is non-contiguous with respect to an element in element position j+1 of a different architectural register regardless of how those element positions are mapped in any given micro-architectural implementation.

In some configurations, it may be implicit, e.g., based on the opcode of the mixed-element-combination instruction that a specific one or more pairs of the set of second elements are to be selected from non-contiguous positions in the second architectural registers. Alternatively, the element information may be explicitly defined and, whilst the programmer or compiler may choose to define the element information such that only consecutive elements are extracted from the second architectural register(s), where the element information is explicitly defined (rather than implicitly defined), the processing circuitry is still be capable of extracting at least one pair of the set of second elements from non-contiguous positions in the second architectural register(s), for example, if different explicit element information was to be provided.

As discussed, whilst the element information may be explicitly specified as an operand of the mixed-element-combination instruction, in some configurations for a first instruction encoding of the mixed-element-combination instruction: the one or more second architectural registers comprises N second architectural registers for each of the one or more first architectural registers, where N is an integer greater than 1; and the processing circuitry is configured, for a given set of N first elements of the set of first elements extracted from N consecutive element positions in one of the one or more first architectural registers, to extract N second elements from the N second architectural registers corresponding to the one of the one or more first architectural registers, each of the N second elements extracted from a different one of the N second architectural registers. For each of the first architectural registers, N second architectural registers are specified. Hence, the total number of second architectural registers specified is N times the number of first architectural registers that are specified. Each of the first architectural registers corresponds to N of the second architectural registers. The given set of N first elements are extracted from consecutive element positions of one of the set of one or more first architectural registers. In contrast, the N second elements are each extracted from a different one of the N second architectural registers. Each of the N second elements may be extracted from any element position within the second architectural register. For example, each of the N second elements may be extracted from a different element position within the second architectural registers. For the first instruction encoding, the element information is, at least partially, implicitly specified in the first instruction encoding and the instruction decoder circuitry is responsive to the first instruction encoding to cause the processing circuitry to extract the N second elements from non-contiguous positions. In particular, the positions from which the N second elements are extracted from the N second architectural registers are non-contiguous because they are positions in different ones of the N second architectural registers.

In some configurations the second element size is N times the first element size. In other words, where the first element size is p-bits, the second element size is (N time p)-bits. As a result, the number of bits taken up in the one or more first architectural registers and the N second architectural registers for the given N elements is the same. This can be particularly advantageous as the same number of elements can be presented in the one or more first architectural registers and in the N second architectural registers.

Whilst the N second element positions can be any positions in the N second architectural registers, for example, as specified by indexing information included in the mixed-element-combination instruction, in some configurations each of the N second elements is extracted from a same set of bit positions within the N second architectural registers. This approach results in a more compact implementation because the N second elements do not need to be moved across lanes within the processing circuitry. Rather, in order to achieve pair-wise combination between the N first elements and the N second elements, it is only the N first elements that need to be moved across lanes. As the total size of the N second elements is N times greater than the N first elements, this approach can enable a micro-architectural implementation that requires fewer cross lane connections.

In some configurations bit positions in the first vector register from which the given set of N first elements are extracted and are one of: the same set of bit positions; and/or a set of offset bit positions different from the same set of bit positions by an integer multiple of a total number of bit positions included in the same set of bit positions. Where the bit positions in the first vector register are the same set of bit positions, the need to move elements across lanes can be reduced further. In particular, the N first elements and the N second elements are all extracted from the same bit positions from their respective architectural registers. By enabling cases in which the offset in bit positions is equal to the integer multiple of the total number of bit positions included in the same set of bit positions, a useful trade-off between flexibility and efficiency can be provided with cross lane connections being provided for only a subset of possible combinations of elements.

Whilst the order in which elements are extracted from the different ones of the N second architectural registers may vary, in some configurations, for the first instruction encoding, the processing circuitry is configured to extract the N second elements from alternating ones of the one or more second architectural registers. Whilst the total number of elements extracted may be N, in some use cases, the total number of elements may be greater than N. In such cases, the processing circuitry sequentially alternates through each of the N second architectural registers multiple times, taking sequential ones of the set of second elements in turn from each of the N second architectural registers.

In some configurations for the first instruction encoding: each of the set of first elements and the set of second elements comprises a total of M elements, wherein M is an integer greater than or equal to N; and the processing circuitry is responsive to the mixed-element-combination instruction to perform the mixed-element-combination operation for a plurality of different sets of M elements extracted from at least one of the one or more first architectural registers and the one or more second architectural registers. In such configurations, the processing operations performed by the processing circuitry, in response to the mixed-element-combination instruction encoded using the first instruction encoding include multiple mixed-element-combination operations carried out on different sets of M elements extracted from different positions in the first and second architectural register(s). Each of the mixed-element combination operations may comprise extracting a single set of N first and second elements. Alternatively, each of the mixed-element combination operations may comprise extracting plural sets of N first and second elements from the respective architectural registers. The processing circuitry is therefore able to provide a high compute density with the mixed-element-combination operation being carried out multiple times across the width of the architectural registers. In some configurations, the mixed-element-combination operation is performed for each possible combination of the different sets of M elements. For example, if P sets of M first elements are extracted from the one or more first architectural registers and Q sets of M second elements are extracted from the one or more second architectural registers (where P and Q are integers greater than or equal to 1), then a total of P times Q mixed-element-combination operations may be performed to combine all combinations of the different sets of M elements (i.e., for each p belonging to the set of integers from 1 to P, and each q belonging to the set of integers from 1 to Q, a mixed-element-combination operation is performed to combine the p-th set of M first elements with the q-th set of M second elements). In some configurations, the mixed element combination operation is performed for corresponding pairs of sets of M first and second elements. For example, if P sets of M first elements are extracted from the one or more first architectural registers, then P sets of the M second elements are also extracted from the one or more second architectural registers and a total of P mixed-element-combination operations are performed to combine corresponding pairs of the sets of M elements (i.e., for p belonging to the set of integers from 1 to P, the p-th set of M first elements is combined with the p-th set of M second elements).

In some configurations, for the first instruction encoding, the mixed-element-combination operation performed for each of the plurality of different sets generates a corresponding result element of a result matrix. The mixed-element-combination operations performed in such configurations therefore generate multiple result elements in a result matrix with each result element being a combination of corresponding intermediate result elements which, in turn, are an arithmetic combination of a pair of elements including a first element and a second element.

Whilst the above configurations provide an instruction that can be used to perform multiple ones of the mixed-element-combination operation across a number of sets of elements to generate multiple result elements, the inventors have recognised that, in some configurations, it may be desirable to omit one or more sets of elements from the mixed-element-combination operation. In some configurations the mixed-element-combination instruction specifies at least one first element predicate register, each first predicate element in the first element predicate register corresponding to a set of N first elements of the set of first elements; and the processing circuitry is configured, when performing the mixed-element-combination operation and when a given first predicate element corresponding to the given set of N first elements has a predetermined value, to exclude performing the at least one arithmetic operation for each first element in the given set of N first elements. In some configurations the first element predicate register is an architecturally defined predicate register. The first element predicate register enables a programmer or compiler to identify one or more sets of N first elements that are not to be included in the mixed-element combination operation by setting a corresponding element in the first element predicate register. Where only a single mixed-element-combination operation is performed, the first element predicate register also acts to prevent the corresponding second elements that would be combined with the first elements identified in the first element predicate register from being included in the operation.

In some configurations the mixed-element-combination instruction specifies at least one second element predicate register, each second predicate element in the second element predicate register corresponding to a set of N second elements of the set of second elements; and the processing circuitry is configured, when performing the mixed-element-combination operation and when a given second predicate element corresponding to a given set of N second elements has a predetermined value, to exclude performing the at least one arithmetic operation for each second element in the given set of N second elements. In some configurations, the second element predicate register is an architecturally specified register. The second element predicate register enables a programmer or compiler to identify one or more sets of N second elements that are not to be included in the mixed-element combination operation by setting a corresponding element in the second element predicate register. Where only a single mixed-element-combination operation is performed, the second element predicate register also acts to prevent the corresponding first elements that would be combined with the second elements identified in the second element predicate register from being included in the operation. By specifying one or both of the first element predicate register and the second element predicate register, the programmer or compiler can control the specific elements included in the mixed-element-combination operations performed for a given instance of the mixed-element-combination instruction.

Whilst the element information may be specified implicitly, or semi-implicitly, as described above, in some configurations the instruction decoder circuitry is responsive to a second instruction encoding of the mixed-element-combination instruction specifying the element information as an index operand identifying a set of locations in the one or more second architectural registers; and the processing circuitry is configured to select, as the set of second elements, elements from the one or more second architectural registers identified in the index operand. The index operand enables a programmer or compiler to explicitly specify the second elements to be included in the mixed-element combination operation. The element information can identify any second elements, including contiguous elements in the second architectural register, non-contiguous elements in the second architectural register and/or repeated elements in the second architectural register. In some configurations, the processing circuitry is responsive to at least one value of the index, to select architectural registers from contiguous elements in the one or more second architectural registers. In some configurations the processing circuitry is configured, for at least one value of the index operand, to select at least one pair of second elements of the corresponding set of second elements from non-contiguous elements in the one or more second architectural registers. Regardless of the elements specified by the index in any particular use case, the processing circuitry is responsive to at least one value of the element information to select at least one pair of second elements from non-contiguous elements in the one or more second architectural register. In other words, the processing circuitry is capable of selecting the set of second elements from non-contiguous positions in the one or more second architectural registers. The element information can take any form, for example, a bit mask identifying particular elements in the second architectural register or a list of integers, each integer identifying an element position from which an element is to be extracted.

In some configurations the index operand identifies P elements in the one or more second architectural registers, wherein P is an integer greater than 1; and the processing circuitry is responsive to the second instruction encoding to perform the mixed-element-combination operation for a plurality of different sets of P elements from the one or more first architectural registers and the P elements. The value of P may be identified by the programmer or compiler or may be defined by the second instruction encoding. In other words, the same set of P elements, as identified by the element information, may be combined with different sets of P first elements extracted from different positions in the first architectural register. In some implementations, multiple second instruction encodings may be provided for different values of P.

In some configurations, for the second instruction encoding, the mixed-element-combination operation performed for each of the plurality of different sets generates a corresponding result element in a result vector. Hence, plural mixed-element-combination operations can be performed for a same set of P elements extracted from the second architectural register(s) combined with a different set of first elements to generate a corresponding result element.

In some configurations, for the second instruction encoding, the one or more first architectural registers comprises a plurality of first architectural registers. In some configurations, for the second instruction encoding, the one or more second architectural registers comprise a single architectural register. For configurations in which plural mixed-element-combination operations are performed, the provision of plural first architectural registers and a single second architectural register enables mixed-element-combination operations to be performed that combine greater number of sets of first elements with a set of second elements identified by the element information reducing the number of instructions required for such operations.

Whilst the first element size and the second element size can take any element sizes that are different from one another, in some configurations the second element size is larger than the first element size. Furthermore, in some configurations the second element size is twice the first element size.

The arithmetic operation can be any arithmetic operation, for example addition. In some configurations the at least one arithmetic operation comprises a multiplication. In such configurations, each intermediate result element is generated from a multiplication of a first element with a corresponding second element.

Furthermore, combining the set of intermediate results can be performed in any manner. For example, the intermediate results may be combined through a second arithmetic operation, e.g., multiplication. In some configurations combining the set of intermediate results comprises summing the intermediate results. For configurations in which the arithmetic operation is multiplication and the combining comprises summing the intermediate results, the result element is a sum of products of the first set of elements and the second set of elements and may be considered as a dot product (inner product) of the first set of elements and the second set of elements. In some configurations, combining the set of intermediate results comprises accumulating the intermediate results with the result element.

In some configurations the first element size is 4-bit and the second element size is 8-bit. The use of smaller elements having lower bit widths is desirable in some machine learning applications. In some configurations the first element size is 2-bits and the second element size is 8-bits or 4-bits. It will be readily apparent to the person of ordinary skill in the art that the number of bits used in can be varied dependent on the particular implementation and in some configurations, multiple encodings of the mixed-element-combination instruction may be provided for different sized first elements and/or different sized second elements.

In some configurations each of the one or more first architectural registers and the one or more second architectural registers are vector architectural registers. In some configurations the vector architectural registers may be a portion of a matrix architectural register or a tile architectural register with the vector architectural register identified as a linear subset of elements of the matrix register or the tile register.

In some configurations the mixed-element-combination operation comprises a mixed-element-dot-product operation. The mixed-element-combination operation may comprise one or multiple mixed-element-dot-product operations. In some configurations the mixed-element-combination operation comprises a mixed-element-outer-product operation. The mixed-element-outer-product operation may be a multi input-mixed-element-outer-product operation in which the output is a sum of outer products of different elements and each result element is identified as a dot product.

In some configurations the processing circuitry is configured, when performing the mixed-element-combination operation to store the results element to a results architectural register.

Particular configurations will now be described with reference to the figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor a register renaming stage could be included for mapping architectural registers specified by program instructions or micro-operations to physical register specifiers identifying physical registers in the register file 14. Alternatively, or in addition, the processing apparatus of FIG. 1 could be extended to include a scalable matrix extension (SME) configured to perform one or more matrix operations.

The execute stage 16 includes a number of processing units, for executing different classes of processing operation. For example the execution units may include a scalar processing unit 20 (e.g. comprising a scalar arithmetic/logic unit (ALU) 20 for performing arithmetic or logical operations on scalar operands read from the registers 14); a vector processing unit 22 for performing vector operations on vectors comprising multiple data elements; a matrix processing unit 35 for performing matrix processing operations on vectors and matrices comprising multiple data elements; and a load/store unit 28 for performing load/store operations to access data in a memory system 8, 30, 32, 34. Other examples of processing units which could be provided at the execute stage could include a floating-point unit for performing operations involving values represented in floating-point format, or a branch unit for processing branch instructions.

The registers 14 include scalar registers 25 for storing scalar values, vector registers 26 for storing vector values, matrix registers 35 for storing matrix values, and predicate registers 27 for storing predicate values. The predicate values 27 may be used by the vector processing unit 22 when processing vector instructions, with a predicate value in a given predicate register indicating which data elements of a corresponding vector operand stored in the vector registers 26 are active data elements or inactive data elements (where operations corresponding to inactive data elements may be suppressed or may not affect a result value generated by the vector processing unit 22 in response to a vector instruction).

A memory management unit (MMU) 36 controls address translations between virtual addresses specified by load/store requests from the load/store unit 28 and physical addresses identifying locations in the memory system, based on address mappings defined in a page table structure stored in the memory system. The page table structure may also define memory attributes which may specify access permissions for accessing the corresponding pages of the address space, e.g. specifying whether regions of the address space are read only or readable/writable, specifying which privilege levels are allowed to access the region, and/or specifying other properties which govern how the corresponding region of the address space can be accessed. Entries from the page table structure may be cached in a translation lookaside buffer (TLB) 38 which is a cache maintained by the MMU 36 for caching page table entries or other information for speeding up access to page table entries from the page table structure shown in memory.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

The instructions decoded by the instruction decoder 10 at the decode stage of the pipeline 4 may be defined according to a particular instruction set architecture (ISA). ISA design is a difficult task, since while in principle it may be useful to provide specific instructions for performing many different processing operations, in practice the amount of encoding space available for encoding different types of instructions may be limited (it is not practical to keep expanding the number of bits in the instruction encoding in an unlimited manner, as this will incur extra circuit area and power costs in providing wider signal paths for passing instructions within the processor, additional decode circuit logic in the decode stage 20 for decoding the increased number of bits, and greater memory overhead for storing instructions in the caches 8, 32 or memory 34). Another issue for ISA designers is that once an ISA includes a particular instruction, it can be very difficult (if not impossible) to remove that instruction from future iterations of the architecture because there will be legacy code which has been written to make use to that instruction, and it will generally be desirable to support such legacy code in future versions of the architecture. Given the limited encoded space available and the legacy code issues, this means that in practice ISA designers tend to be extremely conservative at introducing new instructions into the architecture, and will not tend to introduce new instructions using up valuable encoding space unless it is clear that there is a demand for that instruction so that the instruction is likely to be useful in practice.

Figure 2:
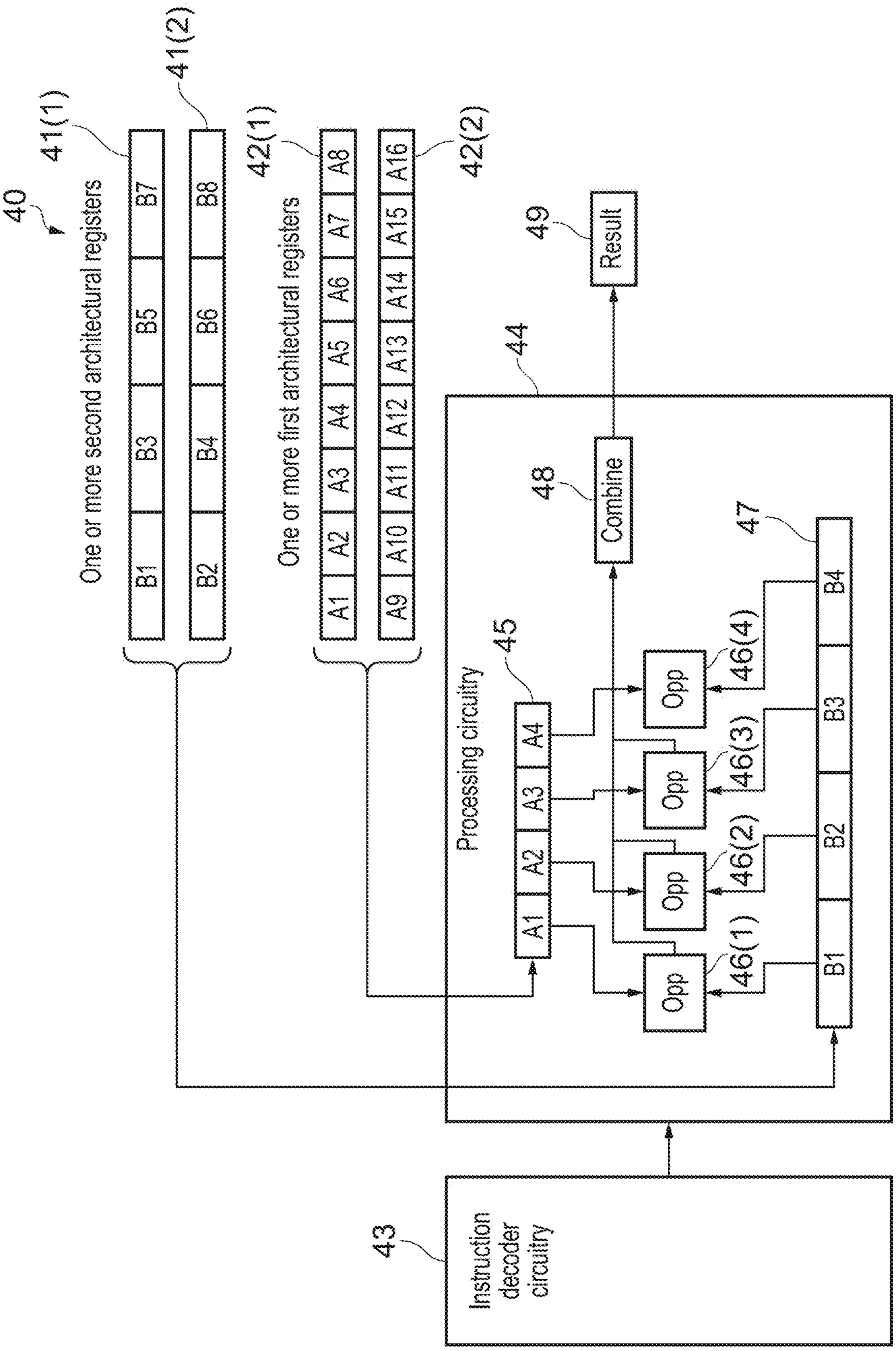
FIG. 2 schematically illustrates an apparatus according to some configurations of the present techniques.

FIG. 2 schematically illustrate an apparatus 40 according to some configurations of the present techniques. The apparatus 40 is provided with instruction decoder circuitry 43 and processing circuitry 44. The instruction decoder circuitry 43 is configured to receive a sequence of program instructions and to decode those program instructions in order to control the processing circuitry 44. The instruction decoder circuitry is responsive to a mixed-element-combination instruction identifying one or more first architectural registers 42 and one or more second architectural registers 41. Furthermore, the mixed-element-combination instruction encodes element information identifying elements to be selected from the one or more second architectural registers 41.

In the illustrated configuration, the mixed-element-combination instruction identifies two second architectural registers 41 including a first second architectural register 41(1) and a second second architectural register 41(2). Each of the elements in the second architectural registers 41 includes a plurality of elements having a second element size. The mixed-element-combination instruction identifies two first architectural registers 42 including a first first architectural register 42(1) and a second first architectural register 42(2). Each of the elements in the first architectural registers has a first element size which, in the illustrated configuration is half of the second element size.

The instruction decoder circuitry 43 controls the processing circuitry 44 to extract a set of first elements 45 from the first architectural registers 41. The first set of elements 45 are extracted from consecutive element positions of the first architectural registers 41. In the illustrated configurations, elements A1, A2, A3, and A4 are extracted from the first first architectural register 42(1). The instruction decoder circuitry 43 controls the processing circuitry 44 to extract a set of second elements 47 from the one or more second architectural registers 41 according to the element information. In the illustrated configuration the element information identifies alternating elements in the one or more second architectural registers and the processing circuitry extracts elements B1, B2, B3 and B4 from the one or more second architectural registers 41. In particular, elements B1 and B3 are extracted from the first second architectural register 41(1) and the elements B2 and B4 are extracted from the second second architectural register 41(2). The second extracted elements 47 comprise elements that are extracted from non-contiguous elements of the one or more second architectural registers 41.

The instruction decoder circuitry 43 controls the processing circuitry to perform a mixed-element-combination operation to combine the elements of the one or more first architectural registers 42 and the one or more second architectural registers 41. First element A1 from the first set of elements 45 and second element B1 from the second set of elements 47 are combined using arithmetic operation 46(1). First element A2 from the first set of elements 45 and second element B2 from the second set of elements 47 are combined using arithmetic operation 46(2). First element A3 from the first set of elements 45 and second element B3 from the second set of elements 47 are combined using arithmetic operation 46(3). First element A4 from the first set of elements 45 and second element B4 from the second set of elements 47 are combined using arithmetic operation 46(4). The results of the arithmetic combinations are then combined using combination circuitry 48 to generate a result element 49.

FIGS. 3A to 3D schematically illustrate mixed-element-combination instructions according to some configurations of the present techniques. In particular, the instructions illustrated in FIGS. 3A to 3D identify instructions in which the element information is implicitly specified.

Figure 3A:
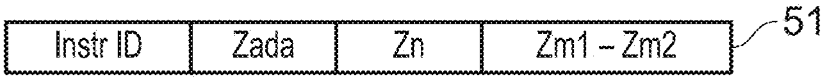
FIG. 3A schematically illustrates an example of an instruction according to some configurations of the present techniques.

FIG. 3A schematically illustrates an encoding 51 of a mixed-element-combination instruction specifying an instruction ID, i.e., an opcode identifying the instruction to the instruction decoder circuitry, an output register Zada, which is a tile register for an SME unit, a first architectural register Zn and a pair of second architectural registers Zm1-Zm2. The element sizes in the first architectural register are half the element sizes of the elements in the second architectural registers. The instruction decoder circuitry is responsive to the encoding 51 to control the processing circuitry to perform a mixed-element-combination operation in which the set of first elements are extracted from consecutive element positions of the first architectural register Zn and in which the set of second elements are extracted from alternating ones of the second architectural registers Zm1-Zm2.

Figure 3B:
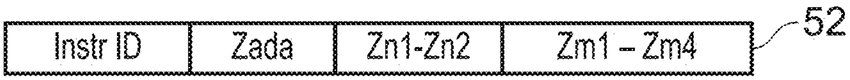
FIG. 3B schematically illustrates an example of an instruction according to some configurations of the present techniques.

FIG. 3B schematically illustrates an encoding 52 of a mixed-element-combination instruction specifying an instruction ID, i.e., an opcode identifying the instruction to the instruction decoder circuitry, an output register Zada, which is a tile register for an SME unit, a pair of first architectural registers Zn1-Zn2, and four second architectural registers Zm1-Zm4. The element sizes in each of the first architectural registers are half the element sizes of the elements in the second architectural registers. The instruction decoder circuitry is responsive to the encoding 52 to control the processing circuitry to perform a mixed-element-combination operation in which the set of first elements are extracted from consecutive element positions in the first architectural registers Zn1-Zn2. For each pair of elements extracted from the first architectural register Zn1 a corresponding pair of second elements are extracted from the second architectural registers Zm1 and Zm2, with one of the pair of second elements extracted from Zm1 and the other extracted from Zm2. The combined set of bit positions from which the pair of first elements are extracted are the same as the bit positions from which each of the second elements are extracted. For each pair of elements extracted from the first architectural register Zn2 a corresponding pair of second elements are extracted from the second architectural registers Zm3 and Zm4, with one of the pair of second elements extracted from Zm3 and the other extracted from Zm4. The combined set of bit positions from which the pair of first elements are extracted are the same as the bit positions from which each of the second elements are extracted.

Figure 3C:
FIG. 3C schematically illustrates an example of an instruction according to some configurations of the present techniques.

FIG. 3C schematically illustrates an encoding 53 of a mixed-element-combination instruction specifying an instruction ID, i.e., an opcode identifying the instruction to the instruction decoder circuitry, an output register Zada, which is a tile register for an SME unit, a first predicate register Pn, a second predicate register Pm, a first architectural register Zn and a pair of second architectural registers Zm1-Zm2. The instruction decoder circuitry is responsive to the encoding 53 to control the processing circuitry to perform a mixed-element-combination operation that is the same as the operation described in relation to FIG. 3A, however, in the mixed-element-combination operation executed in response to the encoding 53, the operations are masked according to the predicate elements. In particular, where a predicate element Pn takes a predetermined value, the mixed-element-combination operation omits arithmetic combinations involving elements of Zn that are identified in Pn. Similarly, where a predicate element Pm takes a predetermined value, the mixed-element-combination operation omits arithmetic combinations involving elements of Zm1-Zm2 that are identified in Pm. It will be readily apparent to the person of ordinary skill in the art that an alternative encoding specifying only one of Pn or Pm may be provided and, dependent on the relative element sizes of Pn and Pm, one or more predicate registers may be identified to mask the first architectural register and/or the second architectural register.

Figure 3D:
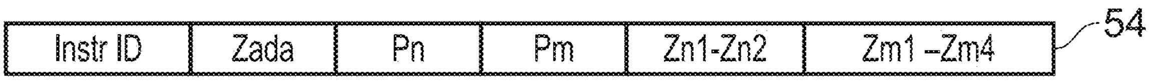
FIG. 3D schematically illustrates an example of an instruction according to some configurations of the present techniques.

FIG. 3D schematically illustrates an encoding 54 of a mixed-element-combination instruction specifying an instruction ID, i.e., an opcode identifying the instruction to the instruction decoder circuitry, an output register Zada, which is a tile register for an SME unit, a first predicate register Pn, a second predicate register Pm, a pair pf first architectural registers Zn1-Zn2 and four second architectural registers Zm1-Zm4. The instruction decoder circuitry is responsive to the encoding 54 to control the processing circuitry to perform a mixed-element-combination operation that is the same as the operation described in relation to FIG. 3B, however, in the mixed-element-combination operation executed in response to the encoding 54, the operations are masked according to the predicate elements. In particular, where a predicate element Pn takes a predetermined value, the mixed-element-combination operation omits arithmetic combinations involving elements of Zn1-Zn2 that are identified in Pn. Similarly, where a predicate element Pm takes a predetermined value, the mixed-element-combination operation omits arithmetic combinations involving elements of Zm1-Zm4 that are identified in Pm. It will be readily apparent to the person of ordinary skill in the art that an alternative encoding specifying only one of Pn or Pm may be provided and, dependent on the relative element sizes of Pn and Pm, one or more predicate registers may be identified to mask the first architectural register and/or the second architectural register.

The instructions identified in each of FIGS. 3A to 3D may be further provided with an offset input identifying an offset position (or offset positions) identifying an initial position in each of the architectural registers from which the first and second set of elements are to be extracted.

Figure 4:
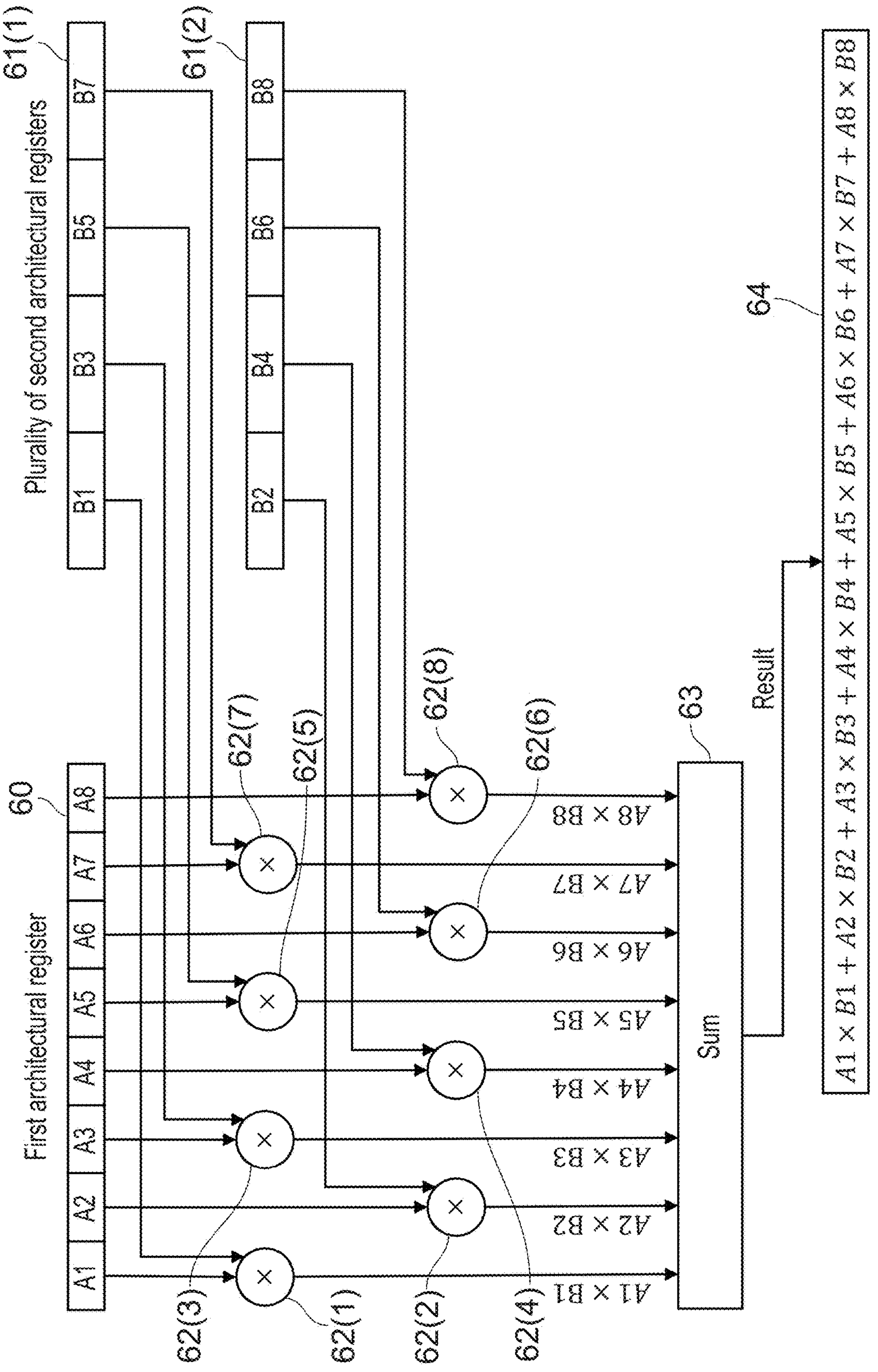
FIG. 4 schematically illustrates an example of an arithmetic combination according to some configurations of the present techniques.

FIG. 4 schematically illustrates an example of a mixed-element-combination operation that may be performed in response to a mixed-element-combination instruction according to some configurations of the present techniques. The mixed-element-combination operation specifies a single first architectural register 60 comprising 8 elements (A1-A8) which are each 4-bit elements, and a pair of second architectural registers 61 including a first second architectural register 61(1) and a second second architectural register 61(2). The first second architectural register 61(1) comprises elements B1, B3, B5, and B7 which are each 8-bit elements. The second second architectural register 61(2) comprises elements B2, B3, B4, and B6 which are each 8-bit elements.

The processing circuitry combines each first element of a first set of elements comprising consecutive elements of the first architectural register 60 with a corresponding second element of a second set of elements extracted from alternating ones of the pair of second architectural registers 61. Each combined pair of elements is combined using a multiplication operation 62 to generate an intermediate element which is passed to summation circuitry 63. Element A1 extracted from the first architectural register 60 is multiplied with element B1 extracted from the first second architectural register 61(1) using multiplication circuit 62(1) to generate an intermediate result element (A1×B1) which is passed to the summation circuitry 63. Element A2 extracted from the first architectural register 60 is multiplied with element B2 extracted from the second second architectural register 61(2) using multiplication circuit 62(2) to generate an intermediate result element (A2×B2) which is passed to the summation circuitry 63. Element A3 extracted from the first architectural register 60 is multiplied with element B3 extracted from the first second architectural register 61(1) using multiplication circuit 62(3) to generate an intermediate result element (A3×B3) which is passed to the summation circuitry 63. Element A4 extracted from the first architectural register 60 is multiplied with element B4 extracted from the second second architectural register 61(2) using multiplication circuit 62(4) to generate an intermediate result element (A4×B4) which is passed to the summation circuitry 63. Element A5 extracted from the first architectural register 60 is multiplied with element B5 extracted from the first second architectural register 61(1) using multiplication circuit 62(5) to generate an intermediate result element (A5×B5) which is passed to the summation circuitry 63. Element A6 extracted from the first architectural register 60 is multiplied with element B6 extracted from the second second architectural register 61(2) using multiplication circuit 62(6) to generate an intermediate result element (A6×B6) which is passed to the summation circuitry 63. Element A7 extracted from the first architectural register 60 is multiplied with element B7 extracted from the first second architectural register 61(1) using multiplication circuit 62(7) to generate an intermediate result element (A7×B7) which is passed to the summation circuitry 63. Element A8 extracted from the first architectural register 60 is multiplied with element B8 extracted from the second second architectural register 61(2) using multiplication circuit 62(8) to generate an intermediate result element (A8×B8) which is passed to the summation circuitry 63.

The intermediate elements are then summed by summation circuitry 63 to generate a result element 64. Because the elements extracted from the pair of second architectural registers 61 are extracted from alternating ones of the pair of second architectural registers, the multiplied elements are retained in a same set of 8-bit lanes as they pass through the processing circuitry, in particular, each 8-bits extracted from the first architectural register 60 and the pair of second architectural registers is able to propagate through the multiplication circuitry without data being passed between 8-bit lanes of the processing circuitry.

Figure 5A:
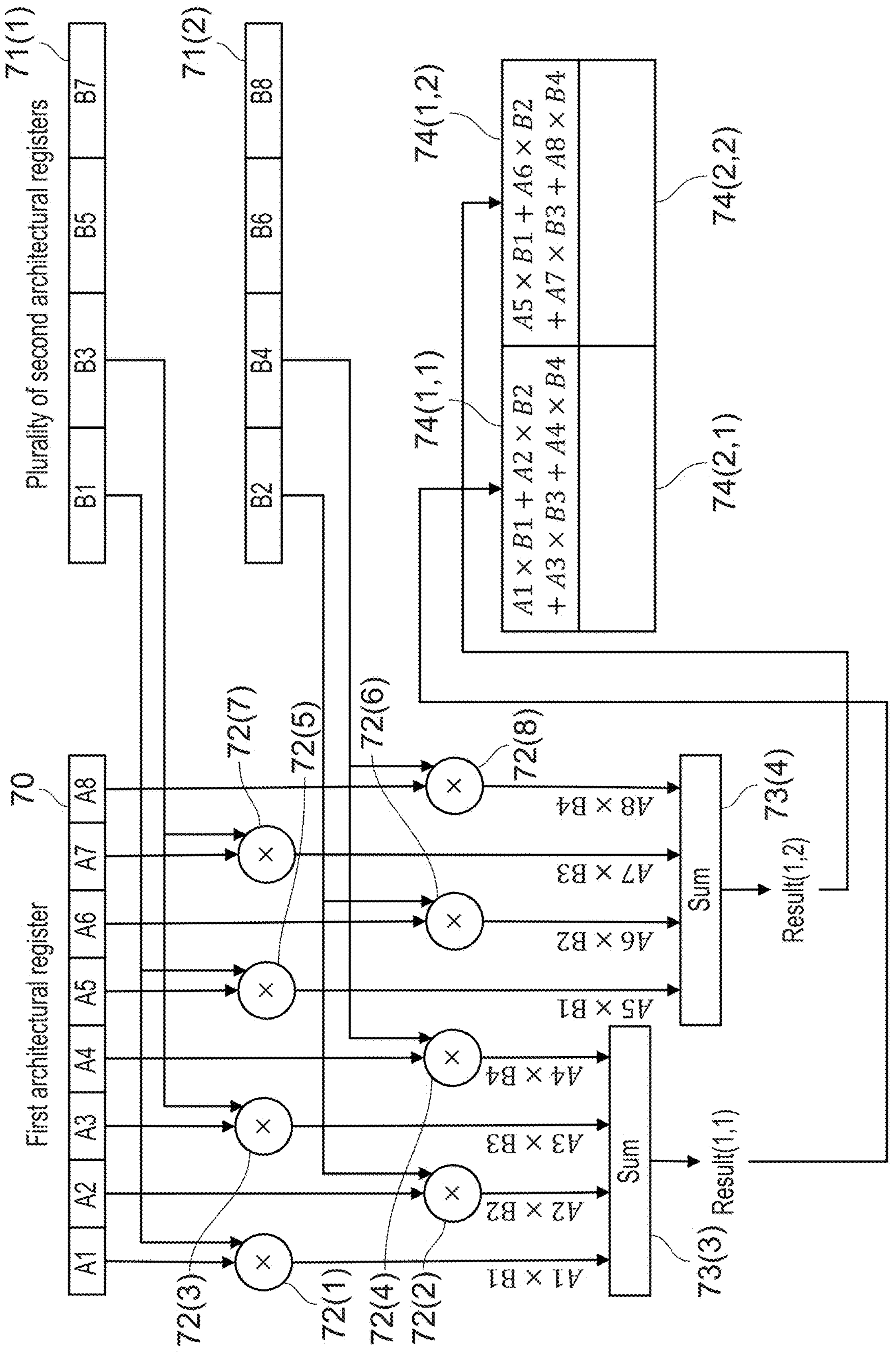
FIG. 5A schematically illustrates an example of an arithmetic combination according to some configurations of the present techniques.
Figure 5B:
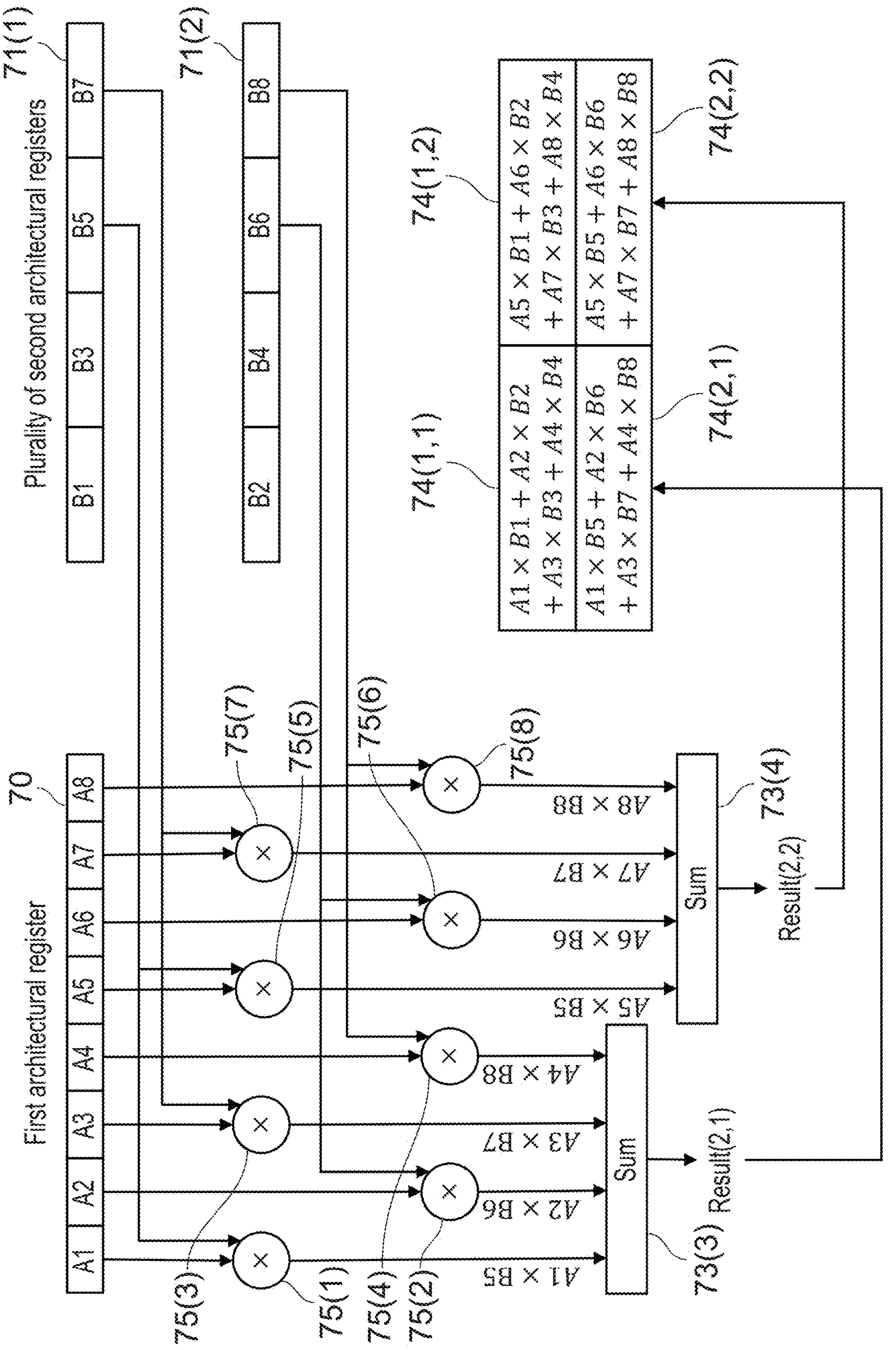
FIG. 5B schematically illustrates an example of an arithmetic combination according to some configurations of the present techniques.

FIGS. 5A and 5B schematically illustrate a further example of a mixed-element combination operation performed in response to a mixed-element-combination instruction in accordance with some configurations of the present techniques. The mixed-element-combination operation specifies a single first architectural register 70 comprising 8 elements (A1-A8) which are each 4-bit elements, and a pair of second architectural registers 71 including a first second architectural register 71(1) and a second second architectural register 71(2). The first second architectural register 71(1) comprises elements B1, B3, B5, and B7 which are each 8-bit elements. The second second architectural register 71(2) comprises elements B2, B3, B4, and B6 which are each 8-bit elements.

In the example of FIGS. 5A and 5B, four mixed-element-combination operations are performed in response to a single mixed-element-combination instruction. However, it will be readily apparent to the person of ordinary skill in the art that, in alternative configurations, the four mixed-element-combination operations may each be performed in response to a different mixed-element-combination instruction specifying (e.g., using a first offset and a second offset) a different portion of each of the first architectural register and the pair of second architectural registers.

FIG. 5A schematically illustrates two of the mixed-element-combination operations (the first and second mixed-element-combination operations). In the first mixed-element-combination operation, the processing circuitry combines first elements A1-A4 of a first set of elements comprising consecutive elements of the first architectural register 70 with a corresponding second element of a second set of elements extracted from alternating ones of the pair of second architectural registers 71. In the case of the first mixed-element-combination operation, the set of first elements extracted from the first architectural registers 70 are selected from a same set of positions as the second elements extracted from the second pair of architectural registers 71. Each pair of elements is combined using a multiplication operation 72 to generate an intermediate element which is passed to summation circuitry 73(1). Element A1 extracted from the first architectural register 70 is multiplied with element B1 extracted from the first second architectural register 71(1) using multiplication circuit 72(1) to generate an intermediate result element (A1×B1) which is passed to the summation circuitry 73(1). Element A2 extracted from the first architectural register 70 is multiplied with element B2 extracted from the second second architectural register 71(2) using multiplication circuit 72(2) to generate an intermediate result element (A2×B2) which is passed to the summation circuitry 73(1). Element A3 extracted from the first architectural register 70 is multiplied with element B3 extracted from the first second architectural register 71(1) using multiplication circuit 72(3) to generate an intermediate result element (A3×B3) which is passed to the summation circuitry 73(1). Element A4 extracted from the first architectural register 70 is multiplied with element B4 extracted from the second second architectural register 71(2) using multiplication circuit 72(4) to generate an intermediate result element (A4×B4) which is passed to the summation circuitry 73(1). The intermediate results passed to the summation circuitry 73(1) are then summed to generate result element 74(1,1).

In the second mixed-element-combination operation, the processing circuitry combines first elements A5-A6 of a first set of elements comprising consecutive elements of the first architectural register 70 with a corresponding second element of a second set of elements extracted from alternating ones of the pair of second architectural registers 71. In the case of the second mixed-element-combination operation, the set of first elements extracted from the first architectural register 70 are selected from positions that are offset from the positions of second elements extracted from the second pair of architectural registers 71 by a number of bits equal to a total number of bits extracted from each of the second architectural registers 71. Each pair of elements is combined using a multiplication operation 72 to generate an intermediate element which is passed to summation circuitry 73(2). Element A5 extracted from the first architectural register 70 is multiplied with element B1 extracted from the first second architectural register 71(1) using multiplication circuit 72(5) to generate an intermediate result element (A5×B1) which is passed to the summation circuitry 73(2). Element A6 extracted from the first architectural register 70 is multiplied with element B2 extracted from the second second architectural register 71(2) using multiplication circuit 72(6) to generate an intermediate result element (A6×B2) which is passed to the summation circuitry 73(2). Element A7 extracted from the first architectural register 70 is multiplied with element B3 extracted from the first second architectural register 71(1) using multiplication circuit 72(7) to generate an intermediate result element (A7×B3) which is passed to the summation circuitry 73(2). Element A8 extracted from the first architectural register 70 is multiplied with element B4 extracted from the second second architectural register 71(2) using multiplication circuit 72(8) to generate an intermediate result element (A8×B4) which is passed to the summation circuitry 73(2). The intermediate results passed to the summation circuitry 73(2) are then summed to generate result element 74(1,2).

FIG. 5B schematically illustrates two of the mixed-element-combination operations (the third and fourth mixed-element-combination operations). In the third mixed-element-combination operation, the processing circuitry combines first elements A1-A4 of a first set of elements comprising consecutive elements of the first architectural register 70 with a corresponding second element of a second set of elements extracted from alternating ones of the pair of second architectural registers 71. In the case of the third mixed-element-combination operation, the set of second elements extracted from the second architectural registers 71 are selected from positions that are offset from the positions of first elements extracted from the first architectural register 70 by a number of bits equal to a total number of bits extracted from the first architectural register 70. Each pair of elements is combined using a multiplication operation 75 to generate an intermediate element which is passed to summation circuitry 73(3). Element A1 extracted from the first architectural register 70 is multiplied with element B5 extracted from the first second architectural register 71(1) using multiplication circuit 75(1) to generate an intermediate result element (A1×B5) which is passed to the summation circuitry 73(3). Element A2 extracted from the first architectural register 70 is multiplied with element B6 extracted from the second second architectural register 71(2) using multiplication circuit 75(2) to generate an intermediate result element (A2×B6) which is passed to the summation circuitry 73(3). Element A3 extracted from the first architectural register 70 is multiplied with element B7 extracted from the first second architectural register 71(1) using multiplication circuit 75(3) to generate an intermediate result element (A3×B7) which is passed to the summation circuitry 73(3). Element A4 extracted from the first architectural register 70 is multiplied with element B8 extracted from the second second architectural register 71(2) using multiplication circuit 75(4) to generate an intermediate result element (A4×B8) which is passed to the summation circuitry 73(3). The intermediate results passed to the summation circuitry 73(3) are then summed to generate result element 74(2,1).

In the fourth mixed-element-combination operation, the processing circuitry combines first elements A5-A6 of a first set of elements comprising consecutive elements of the first architectural register 70 with a corresponding second element of a second set of elements extracted from alternating ones of the pair of second architectural registers 71. In the case of the fourth mixed-element-combination operation, the set of first elements extracted from the first architectural registers 70 are selected from a same set of bit positions as the second elements extracted from the second pair of architectural registers 71. Each pair of elements is combined using a multiplication operation 75 to generate an intermediate element which is passed to summation circuitry 73(4). Element A5 extracted from the first architectural register 70 is multiplied with element B5 extracted from the first second architectural register 71(1) using multiplication circuit 75(5) to generate an intermediate result element (A5×B5) which is passed to the summation circuitry 75(4). Element A6 extracted from the first architectural register 70 is multiplied with element B6 extracted from the second second architectural register 71(2) using multiplication circuit 75(6) to generate an intermediate result element (A6×B6) which is passed to the summation circuitry 73(4). Element A7 extracted from the first architectural register 70 is multiplied with element B7 extracted from the first second architectural register 71(1) using multiplication circuit 75(7) to generate an intermediate result element (A7×B7) which is passed to the summation circuitry 75(4). Element A8 extracted from the first architectural register 70 is multiplied with element B8 extracted from the second second architectural register 71(2) using multiplication circuit 75(8) to generate an intermediate result element (A8×B8) which is passed to the summation circuitry 73(4). The intermediate results passed to the summation circuitry 73(4) are then summed to generate result element 74(2,2).

Figure 6:
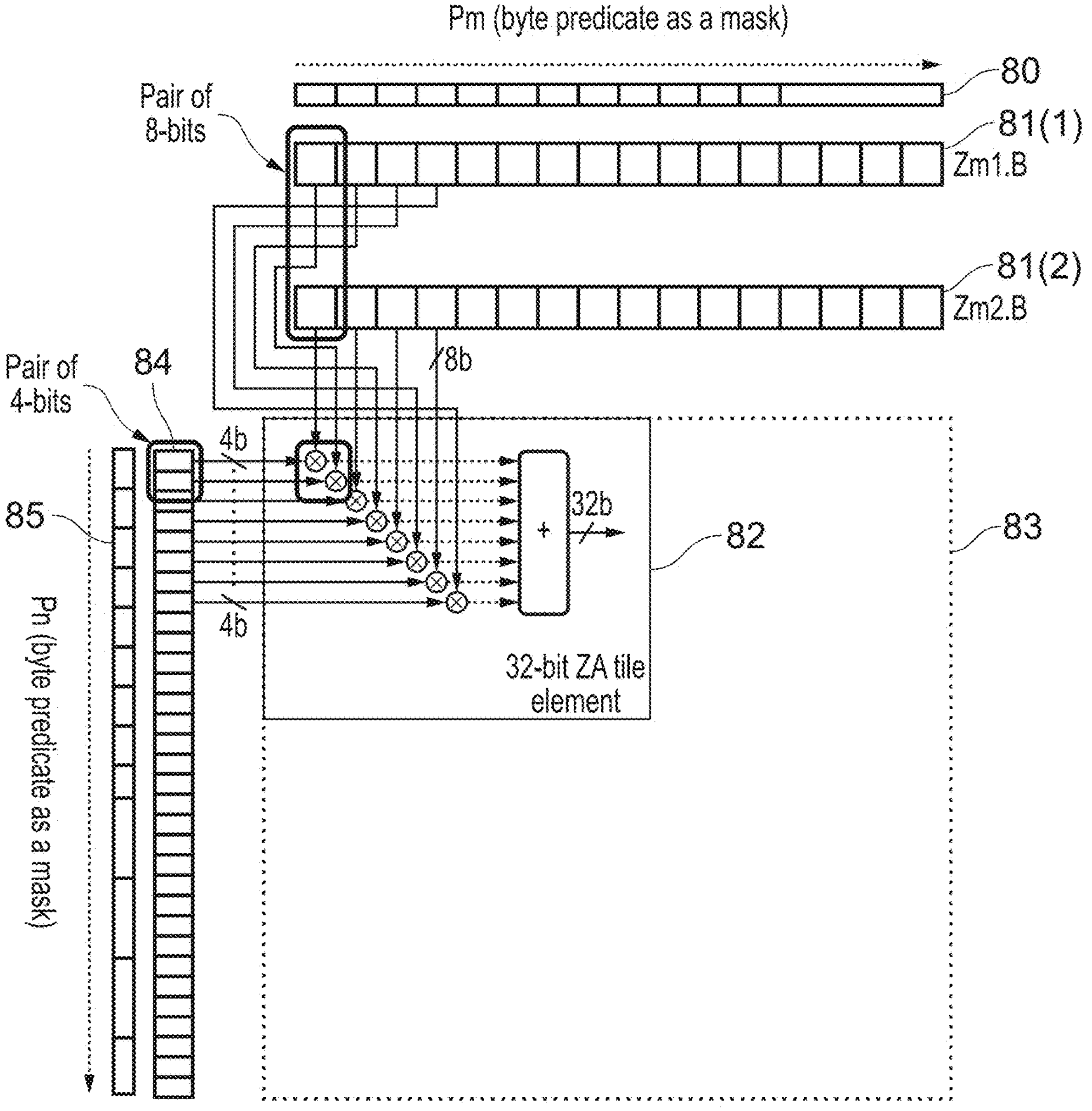
FIG. 6 schematically illustrates an example of an arithmetic combination according to some configurations of the present techniques.

FIG. 6 schematically illustrates a further example of a mixed-element combination operation performed in response to a mixed-element-combination instruction in accordance with some configurations of the present techniques. In the illustrated configuration, the mixed-element-combination instruction specifies a single first architectural register 84, a single first predicate register 85, a pair of second architectural registers 81, a second element predicate register 80, and a result element location 82 in a destination register ZA 83. The first architectural register 84 comprises 4-bit first elements and the pair of second architectural registers 81 each comprise 8-bit second elements such that a pair of first elements (N elements where N equals 2) in the first architectural register 84 take up a same number of bits as each of the second elements in the pair of second architectural registers 81. Each predicate element in the first predicate register corresponds to a pair of elements in the first architectural register 84, and each second element of the second predicate register 80 corresponds to a pair of elements split between the second architectural registers 81. As a result, each predicate element in the first predicate register 80 and the second predicate register 85 corresponds to 8-bits of elements in the respective one of the first architectural register 84 and each of the pair of second architectural registers 81.

The processing circuitry is configured, when performing the mixed-element-combination operation to combine pair-wise elements extracted from consecutive positions of the first architectural register 84, excluding combinations for which a corresponding element of the first predicate register 85 takes a predetermined value, with a corresponding second element selected from alternating ones of the second architectural register 81, excluding combinations for which a corresponding element of the second predicate register 80 takes the predetermined value. The elements are combined pair-wise using a multiplication operation and the results are summed to generate a result element. In the illustrated configuration, eight pairs of elements are multiplied and subsequently summed. The eight elements take up 32-bits in the first architectural register 84 and in each of the pair of second architectural registers 81. The result element is provided as a 32-bit element to be output to the element position 82 of the result register 83.

It will be readily apparent to the person of ordinary skill in the art that the processing operations illustrated in FIG. 6 could be carried out combining any set of 8 consecutive elements of the first architectural register 84 with elements from the second architectural registers 81 to generate an output element at a position in the result register 83. For example, in the illustrated configuration elements are extracted from bits 0-31 of the first architectural register 84, and from bits 0-31 of each of the second architectural registers 81 to generate result element at position (1,1) in the result register 83. In general, the result element at position (p,q) in the result register could be generated by combining first elements taken from bit positions ((p minus 1) times 32) to ((p times 32) minus 1) in the first architectural register 84 with second elements taken from bit positions ((q minus 1) times 32) to ((q times 32) minus 1) in the second architectural register 81, where p and q may be specified as offset values in the mixed-element-combination instruction.

Figure 7:
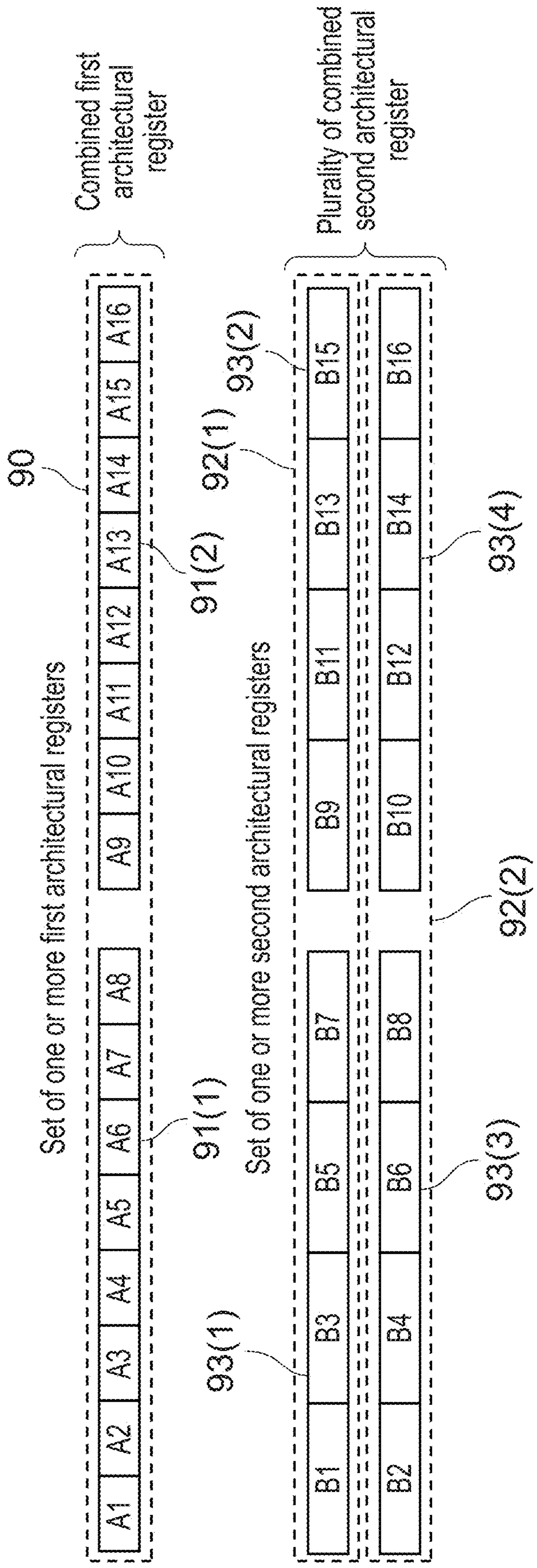
FIG. 7 schematically illustrate sets of one or more architectural registers according to some configurations of the present techniques.

FIG. 7 schematically illustrates the use of plural first architectural registers according to some configurations of the present techniques. For some instruction encodings, the mixed-element-combination operation may specify plural first architectural registers 91. For example, in the illustrated configuration, the encoding (e.g., as illustrated in FIG. 3B) specifies a first first architectural register 91(1) and a second first architectural register 91(2). The encoding also specifies four second architectural registers 93 including a first second architectural register 93(1), a second second architectural register 93(2), a third second architectural register 93(3), and a fourth second architectural register 93(4). Each element in the second architectural registers 93 is twice the size of each element in the first architectural registers 91

In the illustrated configuration, the processing circuitry is configured to perform the mixed-element-combination operation by considering the first architectural registers 91 to be a combined first architectural register 90 generated by concatenating the first first architectural register 91(1) with the second first architectural register 91(2). Similarly, the processing circuitry is configured to consider the second architectural registers as a pair of combined second architectural registers 92 where a first combined second architectural register 92(1) is generated by concatenating the first second architectural register 93(1) with the second second architectural register 93(1), and the second combined second architectural register 92(2) is generated by concatenating the third second architectural register 93(3) with the fourth second architectural register 93(4). The mixed-element-combination operation may be carried out, for example, as described in relation to FIGS. 4 to 6 using the combined first architectural register 90 and the combined second architectural registers 92.

Figure 8:
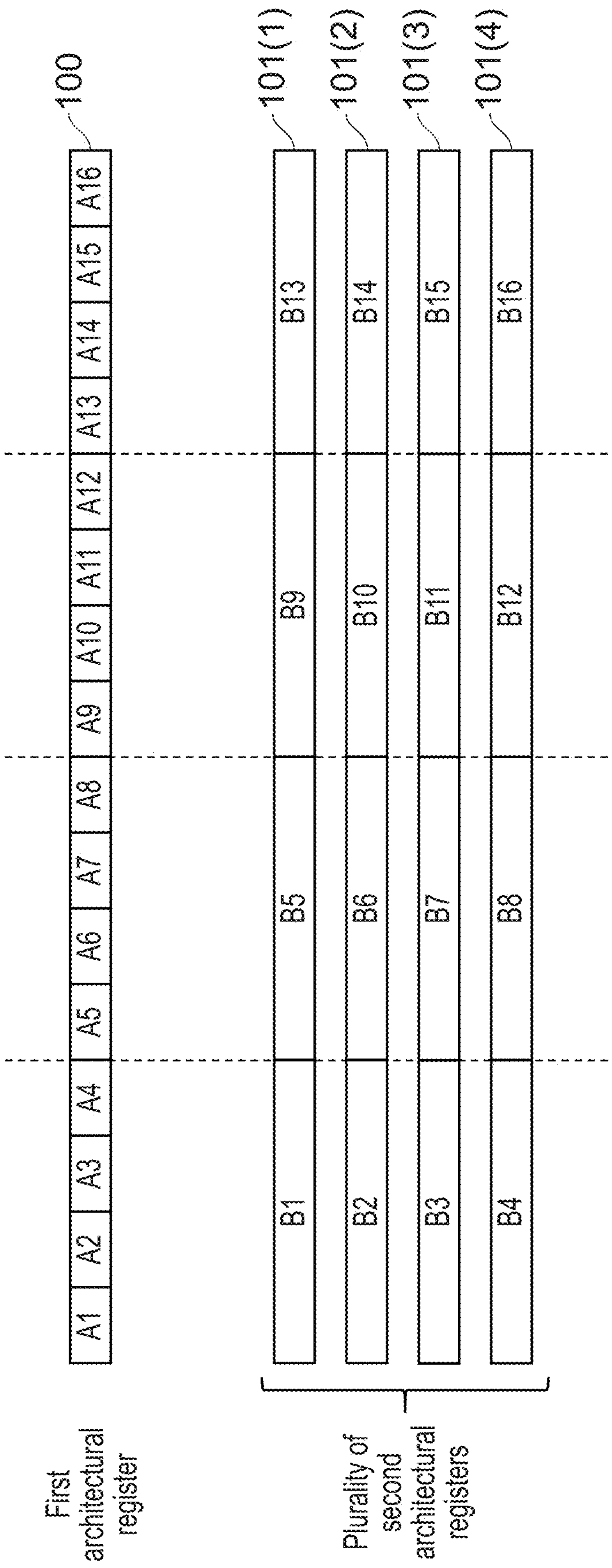
FIG. 8 schematically illustrate sets of one or more architectural registers according to some configurations of the present techniques.

Whilst the above example configuration have considered cases in which the first element size is half of the second element size, this does not have to be the case and, in some configurations the second element size may be even smaller. FIG. 8 schematically illustrates an example in which the second element size is four times the first element size. In the illustrated configuration a first architectural register 100 is specified having elements of a first element size and four second architectural registers 101 are specified having elements of a second element size that is four times the first element size. Because the second elements are distributed across the four second architectural registers 101, combining the elements from the first architectural register and the elements from the second architectural register, as described above, can be performed without data being transferred between different lanes of the processing circuitry (illustrated by dashed lines in FIG. 8). In particular, multiplications between element pairs A1 and B1, A2 and B2, A3 and B3, and A4 and B4 can be carried out in one lane; multiplications between elements A5 and B5, A6 and B6, A7 and B7, and A8 and B8 can be carried out in a second lane; multiplications between elements A9 and B9, A10 and B10, A11 and B11, and A12 and B12 can be carried out in a third lane; and multiplications between elements A13 and B13, A14 and B14, A15 and B15, and A16 and B16 can be carried out in the fourth lane.

Figure 9A:
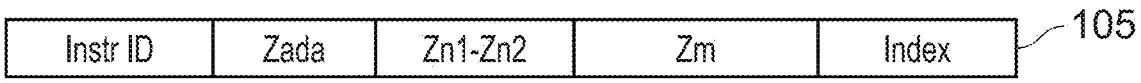
FIG. 9A schematically illustrates an example of an instruction according to some configurations of the present techniques.
Figure 9B:
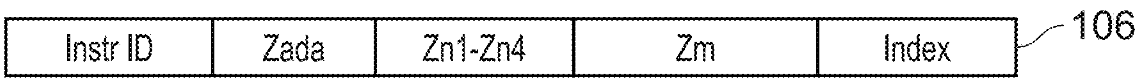
FIG. 9B schematically illustrates an example of an instruction according to some configurations of the present techniques.

FIGS. 9A and 9B schematically illustrate mixed-element-combination instructions according to some configurations of the present techniques. In particular, the instructions illustrated in FIGS. 3A to 3D identify instructions in which the element information is explicitly specified.

FIG. 9A schematically illustrates an encoding 105 of a mixed-element-combination instruction comprising an instruction ID, i.e., an opcode for identifying the instruction to instruction decoder circuitry, a destination register specifier Zada, a pair of first architectural registers Zn1-Zn2, a second architectural register Zm and an index identifying element information. The instruction decoder circuitry is responsive to receipt of the encoding 105 to cause the processing circuitry to perform a mixed element combination operation in which first elements are extracted from consecutive positions of the pair of first architectural registers Zn1-Zn2 which are combined with elements extracted from selected positions of the second architectural register Zm according to the element information provided by the index.

FIG. 9B schematically illustrates an encoding 106 of a mixed-element-combination instruction comprising an instruction ID, i.e., an opcode for identifying the instruction to instruction decoder circuitry, a destination register specifier Zada, four first architectural registers Zn1-Zn4, a second architectural register Zm and an index identifying element information. The instruction decoder circuitry is responsive to receipt of the encoding 105 to cause the processing circuitry to perform a mixed element combination operation in which first elements are extracted from consecutive positions of the four first architectural registers Zn1-Zn4 which are combined with elements extracted from selected positions of the second architectural register Zm according to the element information provided by the index.

Figure 10:
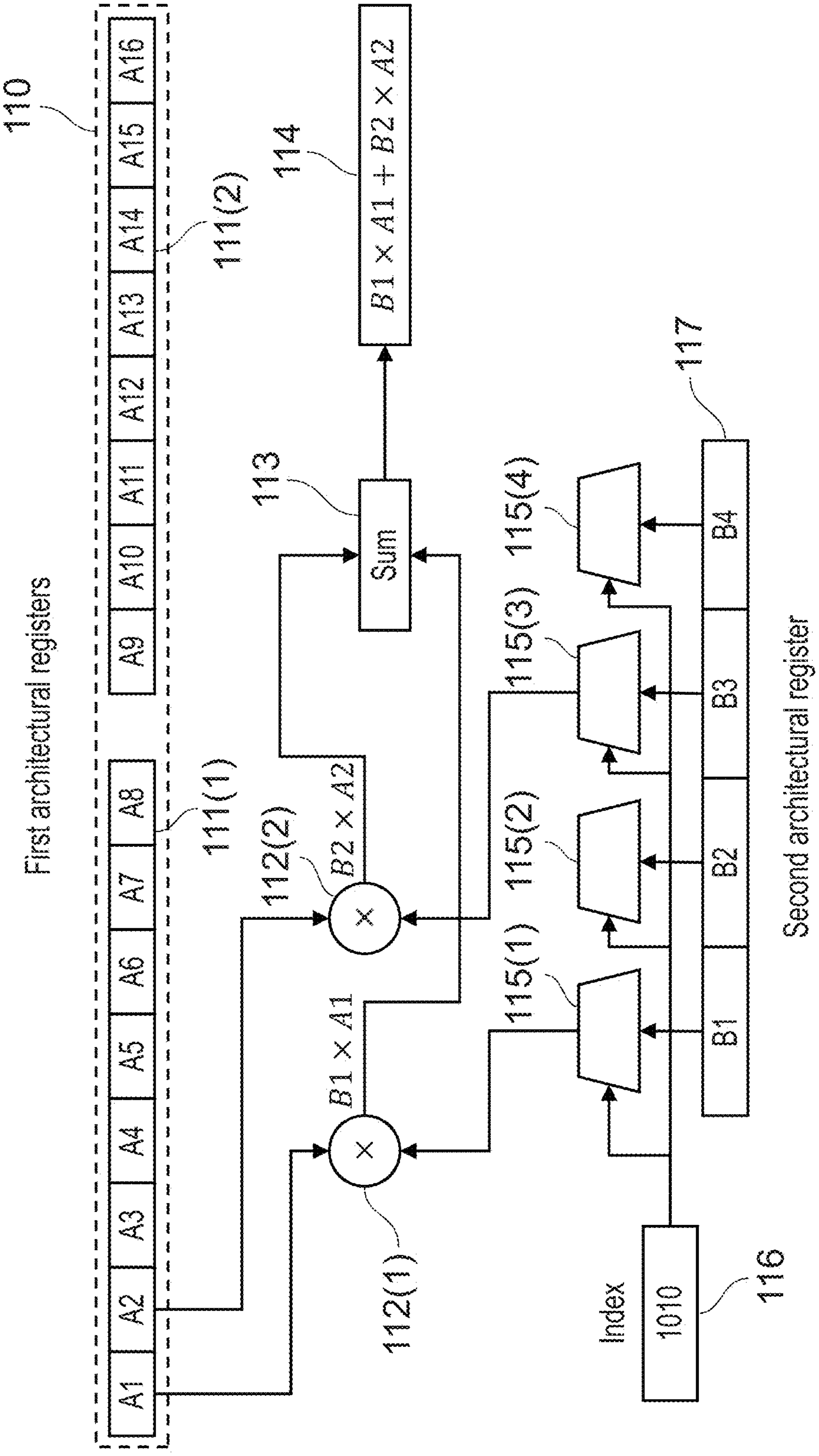
FIG. 10 schematically illustrates an example of an arithmetic combination according to some configurations of the present techniques.

FIG. 10 schematically illustrates an example of a mixed-element-combination operation carried out in response to a mixed-element-combination instruction of the type illustrated in relation to FIG. 9A. The mixed-element-combination instruction specifies a pair of first architectural registers 110 including a first first architectural registers 111(1) and a second first architectural register 111(2). Each of the pair of first architectural registers 110 comprise elements having a first element size. The mixed-element-combination instruction also specifies a second architectural register 117 comprising elements having a second element size greater than the first element size, and index information 116 which, in the illustrated configuration is provided in the form of a bit mask taking values 1010. The bit mask values 1010 indicate that the elements to be extracted from the second architectural register 117 are elements B1 and B3. The index information 116 is passed to selection circuitry 115. Each selection circuit receives a corresponding element from the second architectural register 117 and, based on the element information provided by the index, controls the elements to be passed to multiplication circuitry 112 to be combined. In the illustrated example, selection circuitry 115(1) receives a logical 1 from the index and forwards element B1 to multiplication circuitry 112(1) which also receives element A1 from the first architectural registers 110. The selection circuitry 115(2) receives a logical 0 from the index and does not forward element B2. The selection circuitry 115(3) receives a logical 1 from the index and forwards element B3 to multiplication circuitry 112(2) which also receives element A3 from the first architectural registers 110. The selection circuitry 115(2) receives a logical 0 from the index and does not forward element B2. The multiplication circuits 115 multiply their received inputs and output intermediate result elements to summation circuitry 113 which sums the results to generate result element 114.

Figure 11:
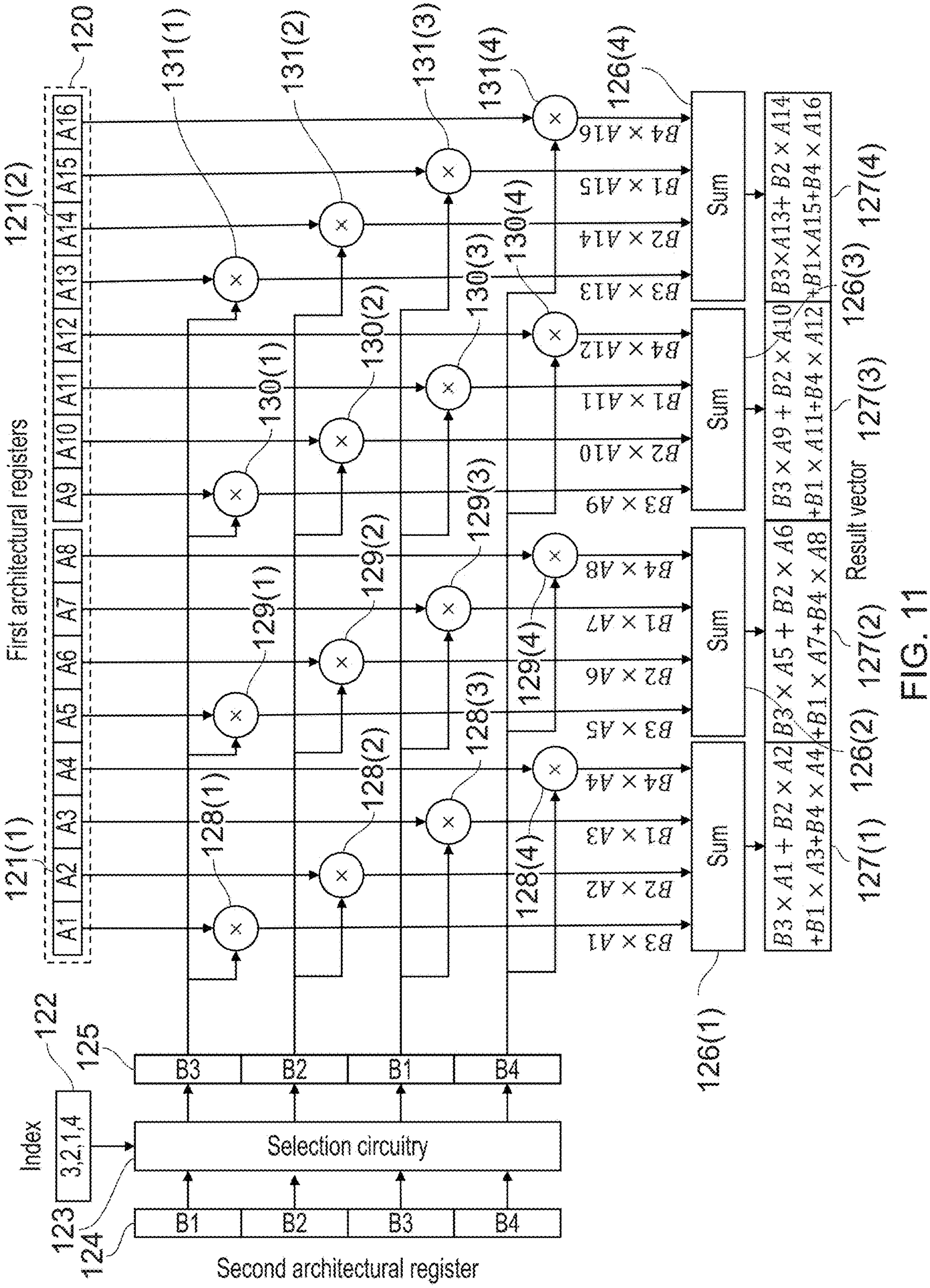
FIG. 11 schematically illustrates an example of an arithmetic combination according to some configurations of the present techniques.

FIG. 11 schematically illustrates an example of a mixed-element-combination operation carried out in response to a mixed-element-combination instruction of the type illustrated in FIG. 9A. The mixed-element-combination instruction specifies a pair of first architectural registers 120 including a first first architectural registers 121(1) and a second first architectural register 121(2). Each of the pair of first architectural registers 120 comprise elements having a first element size. The mixed-element-combination instruction also specifies a second architectural register 124 comprising elements having a second element size which is twice the first element size, and index information 122 which, in the illustrated configuration is provided in the form or a set of element identifiers identifying elements from the second architectural register 124 which are to be combined with elements from the first architectural registers 120.

The index comprises element information 3,2,1,4 identifying that elements should be selected from the second architectural register 124 in the order B3, B2, B1, B4. The index is provided to selection circuitry 123 which also receives the second architectural register 124 and outputs the elements B3, B2, B1, B4 as identified by the index 122. The mixed-element-combination operation causes the elements identified by the index to be multiplied by each consecutive set of four elements in the first pair of architectural registers 120. The sequentially first one of the second elements identified by the element information (B3) is passed to multiplication circuits 128(1), 129(1), 130(1), and 131(1). The sequentially second one of the second elements identified by the element information (B2) is passed to multiplication circuits 128(2), 129(2), 130(2), and 131(2). The sequentially third one of the second elements identified by the element information (B1) is passed to multiplication circuits 128(3), 129(3), 130(3), and 131(3). The sequentially first one of the second elements identified by the element information (B4) is passed to multiplication circuits 128(4), 129(4), 130(4), and 131(4).

In addition to receiving element B3, multiplication circuitry 128(1) also receives element A1 from the first architectural registers 120 and outputs a result (B3×A1) to summation circuitry 126(1). In addition to receiving element B2, multiplication circuitry 128(2) also receives element A2 from the first architectural registers 120 and outputs a result (B2×A2) to summation circuitry 126(1). In addition to receiving element B1, multiplication circuitry 128(3) also receives element A3 from the first architectural registers 120 and outputs a result (B1×A3) to summation circuitry 126(1). In addition to receiving element B4, multiplication circuitry 128(4) also receives element A4 from the first architectural registers 120 and outputs a result (B4×A4) to summation circuitry 126(1). The summation circuitry 126(1) sums the received inputs and outputs a result element 127(1) to a result vector.

In addition to receiving element B3, multiplication circuitry 129(1) also receives element A5 from the first architectural registers 120 and outputs a result (B3×A5) to summation circuitry 126(1). In addition to receiving element B2, multiplication circuitry 129(2) also receives element A6 from the first architectural registers 120 and outputs a result (B2×A6) to summation circuitry 126(1). In addition to receiving element B1, multiplication circuitry 129(3) also receives element A7 from the first architectural registers 120 and outputs a result (B1×A7) to summation circuitry 126(1). In addition to receiving element B4, multiplication circuitry 129(4) also receives element A8 from the first architectural registers 120 and outputs a result (B4×A8) to summation circuitry 126(2). The summation circuitry 126(2) sums the received inputs and outputs a result element 127(2) to a result vector.

In addition to receiving element B3, multiplication circuitry 130(1) also receives element A9 from the first architectural registers 120 and outputs a result (B3×A9) to summation circuitry 126(3). In addition to receiving element B2, multiplication circuitry 130(2) also receives element A10 from the first architectural registers 120 and outputs a result (B2×A10) to summation circuitry 126(3). In addition to receiving element B1, multiplication circuitry 130(3) also receives element A11 from the first architectural registers 120 and outputs a result (B1×A11) to summation circuitry 126(3). In addition to receiving element B4, multiplication circuitry 130(4) also receives element A12 from the first architectural registers 120 and outputs a result (B4×A12) to summation circuitry 126(3). The summation circuitry 126(1) sums the received inputs and outputs a result element 127(3) to a result vector.

In addition to receiving element B3, multiplication circuitry 131(1) also receives element A13 from the first architectural registers 120 and outputs a result (B3×A13) to summation circuitry 126(4). In addition to receiving element B2, multiplication circuitry 131(2) also receives element A14 from the first architectural registers 120 and outputs a result (B2×A14) to summation circuitry 126(4). In addition to receiving element B1, multiplication circuitry 131(3) also receives element A15 from the first architectural registers 120 and outputs a result (B1×A15) to summation circuitry 126(4). In addition to receiving element B4, multiplication circuitry 131(4) also receives element A16 from the first architectural registers 120 and outputs a result (B4×A16) to summation circuitry 126(4). The summation circuitry 126(4) sums the received inputs and outputs a result element 127(4) to a result vector.

Figure 12:
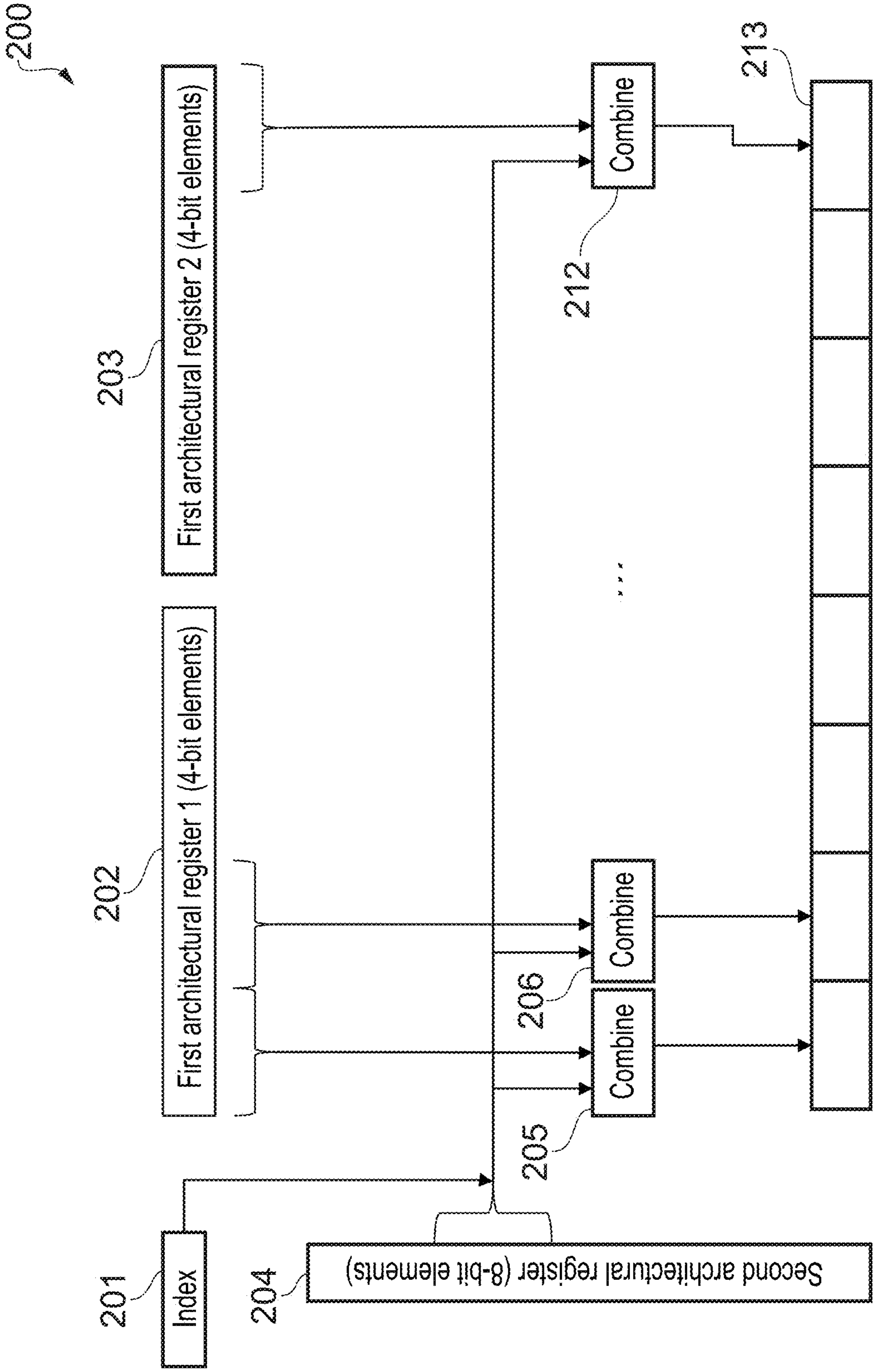
FIG. 12 schematically illustrates an apparatus according to some configurations of the present techniques.

FIG. 12 schematically illustrates an example of an apparatus 200 according to some configurations of the present techniques. The apparatus performs a mixed-element-combination operation in response to a mixed-element-combination instruction specifying a first first architectural register 202, a second first architectural register 203, a second architectural register 204, and an index 201. The index identifies a set of elements within the second architectural register, for example, elements B5, B6, B7, and B8 that are to be combined with each of a set of portions in the combined set of first architectural registers. A first arithmetic combination circuit 205 is provided to combine elements extracted from the indexed portion of the second architectural register 204 with elements extracted from a first portion of the first first architectural register 202 combining the elements comprises performing an arithmetic combination of pairs of first second elements and first elements, e.g., through multiplication, to generate intermediate result elements. The intermediate result elements are then summed. For example, the combination circuitry 205 combines elements A1 and B5, elements A2 and B6, elements A3 and B7, and elements A4 and B8. The combinations are then summed. A second arithmetic combination circuit 206 is provided to combine elements extracted from the indexed portion of the second architectural register 204 with elements extracted from a second portion of the first first architectural register 202 combining the elements comprises performing an arithmetic combination of pairs of second elements and first elements, e.g., through multiplication, to generate intermediate result elements. The intermediate result elements are then summed. For example, the combination circuitry 206 combines elements A5 and B5, elements A6 and B6, elements A7 and B7, and elements A8 and B8. The combinations are then summed. This pattern is continued until an eighth arithmetic combination circuit 212 is provided to combine elements extracted from the indexed portion of the second architectural register 204 with elements extracted from a fourth portion of the second first architectural register 203 combining the elements comprises performing an arithmetic combination of pairs of second elements and first elements, e.g., through multiplication, to generate intermediate result elements. The intermediate result elements are then summed and output to the result register 213.

Figure 13:
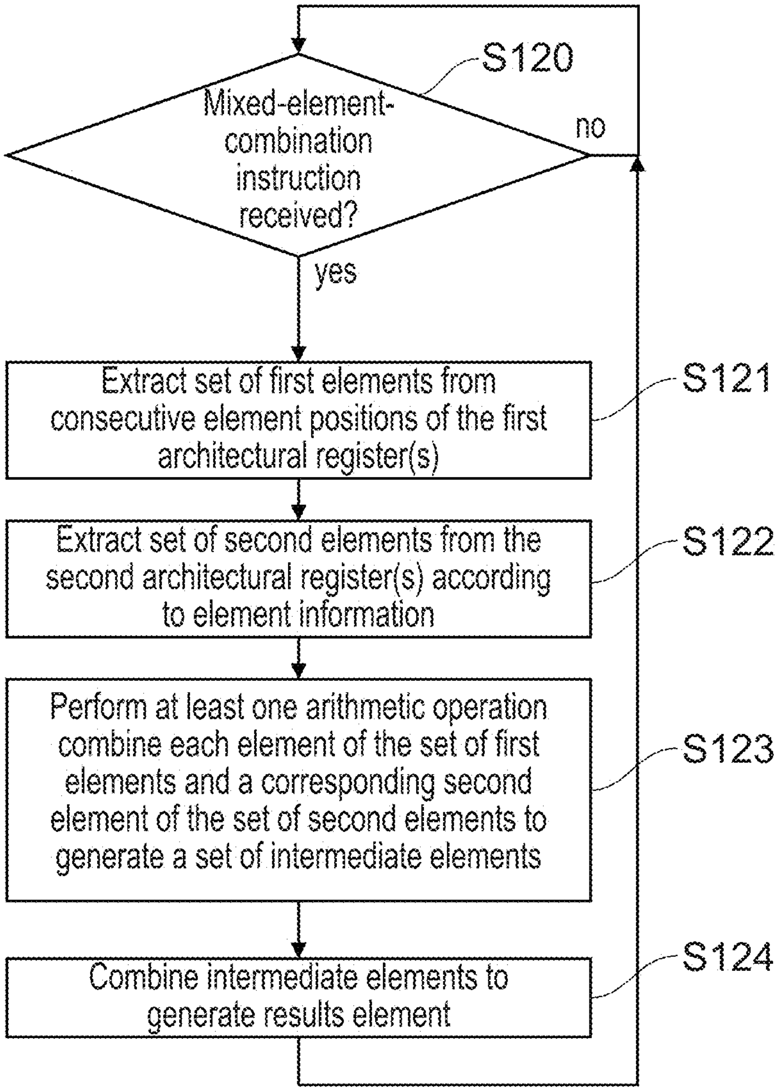
FIG. 13 schematically illustrates a set of steps carried out according to some configurations of the present techniques.

FIG. 13 schematically illustrates a sequence of steps carried out according to some configurations of the present techniques. Flow begins at step S120 where it is determined if a mixed-element-combination instruction specifying one or more first architectural registers and one or more second architectural registers has been received, where the mixed-element-combination instruction encodes element information. If, at step S120, it is determined that a mixed-element-combination instruction has not been received, then flow remains at step S120. If, at step S120, it is determined that a mixed-element-combination operation has been received, then flow proceeds to step S121. At step S121 a set of first elements are extracted from consecutive element positions of the one or more first architectural registers. Flow then proceeds to step S122. At step S122 a set of second elements are extracted from the one or more second architectural registers according to the element information. Flow then proceeds to step S123. At step S123 at least one arithmetic operation is performed to combine each element of the set of first elements and a corresponding one of the set of second elements to generate a set of intermediate result elements. Flow then proceeds to step S124. At step S124, the intermediate result elements are combined to generate a result element before flow returns to step S120.

Figure 14:
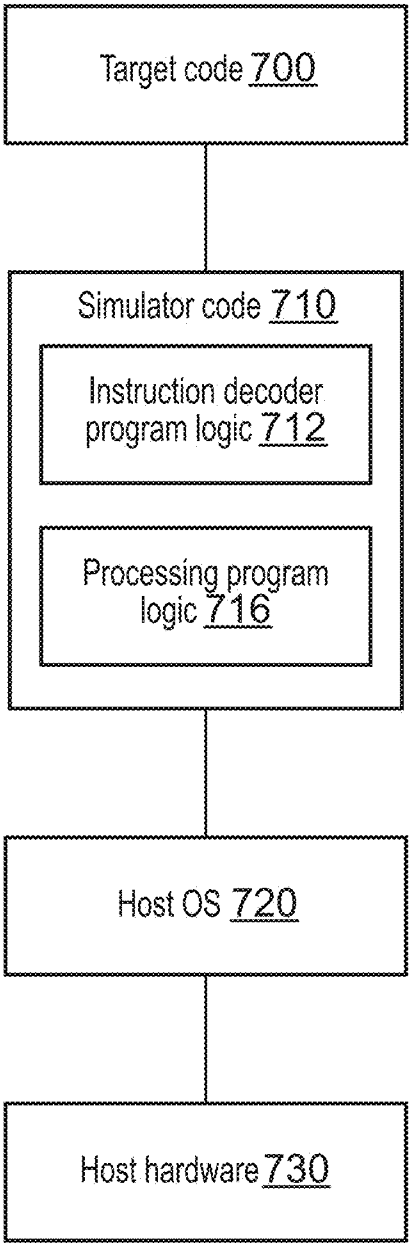
FIG. 14 schematically illustrates a simulator implementation according to some configurations of the present techniques.

FIG. 14 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include applications, operating systems and a hypervisor) which is the same as the interface of the hardware architecture being modelled by the simulator program 710. Thus, the program instructions of the target code 700 may be executed from within the instruction execution environment using the simulator program 710, so that a host computer 730 which does not actually have the hardware features of the apparatus 40 discussed above can emulate these features. In particular, the simulator code 710 comprises instruction decoder program logic 712 configured to decode program instructions and processing program logic 716 configured to perform data processing in response to the instructions decoded by the instruction decoder program logic. The instruction decoder program logic 712 is responsive to a mixed-element-combination instruction specifying one or more first storage structures simulating one or more first architectural registers and one or more second storage structures simulating one or more second architectural registers, to trigger the processing program logic 716 to perform a mixed-element-combination operation, the mixed-element-combination instruction encoding element information identifying a set of elements in the one or more second storage structures. The processing program logic 716 is configured, when performing the mixed-element-combination operation: to perform at least one arithmetic operation to combine each first element of a set of first elements from contiguous positions in the one or more first storage structures with a corresponding second element of a set of second elements selected from the one or more second storage structures according to the element information to generate a set of intermediate result elements; and to combine the set of intermediate result elements to generate a result element. The processing program logic 716 is configured, for at least one value of the element information, to select at least one pair of second elements of the corresponding set of second elements from non-contiguous elements in the one or more second storage structures. A first element size of each first element of the set of first elements is different to a second element size of each second element of the set of second elements.

In brief overall summary there is provided is provided an apparatus comprising decoder circuitry, responsive to a mixed-element-combination instruction specifying one or more first registers and a one or more second registers, to trigger the processing circuitry to perform at least one arithmetic operation to combine each first element of a set of first elements from contiguous positions in the first registers with a corresponding second element of a set of second elements selected from the second registers according to the element information to generate a set of intermediate result elements, and to combine the intermediate result elements to generate a result element. A first element size of each first element is different to a second element size of each second element.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the present techniques are described by the following numbered clauses:

Clause 1. An apparatus comprising:

instruction decoder circuitry configured to decode program instructions;

processing circuitry configured to perform data processing in response to the instructions decoded by the instruction decoder;

wherein:

the instruction decoder circuitry is responsive to a mixed-element-combination instruction specifying one or more first architectural registers and one or more second architectural registers, to trigger the processing circuitry to perform a mixed-element-combination operation, wherein the mixed-element-combination instruction encodes element information identifying a set of elements in the one or more second architectural registers;

the processing circuitry is configured, when performing the mixed-element-combination operation:

to perform at least one arithmetic operation to combine each first element of a set of first elements from contiguous positions in the one or more first architectural registers with a corresponding second element of a set of second elements selected from the one or more second architectural registers according to the element information to generate a set of intermediate result elements; and to combine the set of intermediate result elements to generate a result element; and a first element size of each first element of the set of first elements is different to a second element size of each second element of the set of second elements.

Clause 2. The apparatus of claim 1, wherein the processing circuitry is configured, for at least one value of the element information, to select at least one pair of second elements of the corresponding set of second elements from non-contiguous elements in the one or more second architectural registers.

Clause 3. The apparatus of clause 1 or clause 2, wherein for a first instruction encoding of the mixed-element-combination instruction:

the one or more second architectural registers comprises N second architectural registers for each of the one or more first architectural registers, where N is an integer greater than 1; and the processing circuitry is configured, for a given set of N first elements of the set of first elements extracted from N consecutive element positions in one of the one or more first architectural registers, to extract N second elements from the N second architectural registers corresponding to the one of the one or more first architectural registers, each of the N second elements extracted from a different one of the N second architectural registers.

Clause 4. The apparatus of clause 3, wherein the second element size is N times the first element size.

Clause 5. The apparatus of clause 3 or clause 4, wherein each of the N second elements is extracted from a same set of bit positions within the N second architectural registers.

Clause 6. The apparatus of clause 5, wherein bit positions in the first vector register from which the given set of N first elements are extracted and are one of:

the same set of bit positions; and/or a set of offset bit positions different from the same set of bit positions by an integer multiple of a total number of bit positions included in the same set of bit positions.

Clause 7. The apparatus of any of clauses 3 to 6, wherein for the first instruction encoding, the processing circuitry is configured to extract the N second elements from alternating ones of the one or more second architectural registers.

Clause 8. The apparatus of any of clauses 3 to 7, wherein for the first instruction encoding:

each of the set of first elements and the set of second elements comprises a total of M elements, wherein M is an integer greater than or equal to N; and the processing circuitry is responsive to the mixed-element-combination instruction to perform the mixed-element-combination operation for a plurality of different sets of M elements extracted from at least one of the one or more first architectural registers and the one or more second architectural registers.

Clause 9. The apparatus of clause 8, wherein for the first instruction encoding, the mixed-element-combination operation performed for each of the plurality of different sets generates a corresponding result element of a result matrix.

Clause 10. The apparatus of any of clauses 3 to 9, wherein:

the mixed-element-combination instruction specifies at least one first element predicate register, each first predicate element in the first element predicate register corresponding to a set of N first elements of the set of first elements; and the processing circuitry is configured, when performing the mixed-element-combination operation and when a given first predicate element corresponding to the given set of N first elements has a predetermined value, to exclude performing the at least one arithmetic operation for each first element in the given set of N first elements.

Clause 11. The apparatus of any of clauses 3 to 10, wherein:

the mixed-element-combination instruction specifies at least one second element predicate register, each second predicate element in the second element predicate register corresponding to a set of N second elements of the set of second elements; and the processing circuitry is configured, when performing the mixed-element-combination operation and when a given second predicate element corresponding to a given set of N second elements has a predetermined value, to exclude performing the at least one arithmetic operation for each second element in the given set of N second elements.

Clause 12. The apparatus of any preceding clause, wherein:

the instruction decoder circuitry is responsive to a second instruction encoding of the mixed-element-combination instruction specifying the element information as an index operand identifying a set of locations in the one or more second architectural registers; and the processing circuitry is configured to select, as the set of second elements, elements from the one or more second architectural registers identified in the index operand.

Clause 13. The apparatus of clause 12, wherein:

the index operand identifies P elements in the one or more second architectural registers, wherein P is an integer greater than 1; and the processing circuitry is responsive to the second instruction encoding to perform the mixed-element-combination operation for a plurality of different sets of P elements from the one or more first architectural registers and the P elements.

Clause 14. The apparatus of clause 13, wherein for the second instruction encoding, the mixed-element-combination operation performed for each of the plurality of different sets generates a corresponding result element in a result vector.

Clause 15. The apparatus of any of clauses 12 to 14, wherein for the second instruction encoding, the one or more first architectural registers comprises a plurality of first architectural registers.

Clause 16. The apparatus of any of clauses 12 to 15, wherein for the second instruction encoding, the one or more second architectural registers comprise a single architectural register.

Clause 17. The apparatus of any preceding clause, wherein the second element size is twice the first element size.

Clause 18. The apparatus of any preceding clause, wherein the at least one arithmetic operation comprises a multiplication.

Clause 19. The apparatus of any preceding clause, wherein combining the set of intermediate results comprises summing the intermediate results.

Clause 20. The apparatus of any preceding clause, wherein the first element size is 4-bit and the second element size is 8-bit.

Clause 21. The apparatus of any preceding clause, wherein each of the one or more first architectural registers and the one or more second architectural registers are vector architectural registers.

Clause 22. The apparatus of any preceding clause, wherein the mixed-element-combination operation comprises a mixed-element-dot-product operation.

Clause 23. The apparatus of any preceding clause, wherein the mixed-element-combination operation comprises a mixed-element-outer-product operation.

Clause 24. The apparatus of any preceding clause, wherein the processing circuitry is configured, when performing the mixed-element-combination operation to store the results element to a results architectural register.

Clause 25. A method of operating an apparatus comprising instruction decoder circuitry configured to decode program instructions, and processing circuitry configured to perform data processing in response to the instructions decoded by the instruction decoder, the method comprising:

with the instruction decoder circuitry in response to a mixed-element-combination instruction specifying one or more first architectural registers and one or more second architectural registers, to trigger the processing circuitry to perform a mixed-element-combination operation, the mixed-element-combination instruction encoding element information identifying a set of elements in the one or more second architectural registers;

with the processing circuitry:

performing at least one arithmetic operation to combine each first element of a set of first elements from contiguous positions in the one or more first architectural registers with a corresponding second element of a set of second elements selected from the one or more second architectural registers according to the element information to generate a set of intermediate result elements; and combining the set of intermediate result elements to generate a result element, wherein a first element size of each first element of the set of first elements is different to a second element size of each second element of the set of second elements.

Clause 26. A computer program for controlling a host data processing apparatus to provide an instruction execution environment, the computer program comprising:

instruction decoder program logic configured to decode program instructions;

processing program logic configured to perform data processing in response to the instructions decoded by the instruction decoder program logic;

wherein:

the instruction decoder program logic is responsive to a mixed-element-combination instruction specifying one or more first storage structures simulating one or more first architectural registers and one or more second storage structures simulating one or more second architectural registers, to trigger the processing program logic to perform a mixed-element-combination operation, the mixed-element-combination instruction encoding element information identifying a set of elements in the one or more second storage structures;

the processing program logic is configured, when performing the mixed-element-combination operation:

to perform at least one arithmetic operation to combine each first element of a set of first elements from contiguous positions in the one or more first storage structures with a corresponding second element of a set of second elements selected from the one or more second storage structures according to the element information to generate a set of intermediate result elements; and to combine the set of intermediate result elements to generate a result element; and a first element size of each first element of the set of first elements is different to a second element size of each second element of the set of second elements.

We claim:

1. An apparatus comprising:

instruction decoder circuitry configured to decode program instructions;

processing circuitry configured to perform data processing in response to the instructions decoded by the instruction decoder;

wherein:

the instruction decoder circuitry is responsive to a mixed-element-combination instruction specifying one or more first architectural registers and one or more second architectural registers, to trigger the processing circuitry to perform a mixed-element-combination operation, wherein the mixed-element-combination instruction encodes element information identifying a set of elements in the one or more second architectural registers;

the processing circuitry is configured, when performing the mixed-element-combination operation:

to perform at least one arithmetic operation to combine each first element of a set of first elements from contiguous positions in the one or more first architectural registers with a corresponding second element of a set of second elements selected from the one or more second architectural registers according to the element information to generate a set of intermediate result elements; and to combine the set of intermediate result elements to generate a result element; and a first element size of each first element of the set of first elements is different to a second element size of each second element of the set of second elements.

2. The apparatus of claim 1, wherein the processing circuitry is configured, for at least one value of the element information, to select at least one pair of second elements of the corresponding set of second elements from non-contiguous elements in the one or more second architectural registers.

3. The apparatus of claim 1, wherein for a first instruction encoding of the mixed-element-combination instruction:

the one or more second architectural registers comprises N second architectural registers corresponding to each of the one or more first architectural registers, where N is an integer greater than 1; and the processing circuitry is configured, for a given set of N first elements of the set of first elements extracted from N consecutive element positions in one of the one or more first architectural registers, to extract N second elements from the N second architectural registers corresponding to the one of the one or more first architectural registers, each of the N second elements extracted from a different one of the N second architectural registers.

4. The apparatus of claim 3, wherein the second element size is N times the first element size.

5. The apparatus of claim 3, wherein each of the N second elements is extracted from a same set of bit positions within the N second architectural registers.

6. The apparatus of claim 5, wherein bit positions in the first vector register from which the given set of N first elements are extracted and are one of:

the same set of bit positions; and/or a set of offset bit positions different from the same set of bit positions by an integer multiple of a total number of bit positions included in the same set of bit positions.

7. The apparatus of claim 3, wherein for the first instruction encoding, the processing circuitry is configured to extract the N second elements from alternating ones of the one or more second architectural registers.

8. The apparatus of claim 3, wherein for the first instruction encoding:

each of the set of first elements and the set of second elements comprises a total of M elements, wherein M is an integer greater than or equal to N; and the processing circuitry is responsive to the mixed-element-combination instruction to perform the mixed-element-combination operation for a plurality of different sets of M elements extracted from at least one of the one or more first architectural registers and the one or more second architectural registers.

9. The apparatus of claim 8, wherein for the first instruction encoding, the mixed-element-combination operation performed for each of the plurality of different sets generates a corresponding result element of a result matrix.

10. The apparatus of claim 3, wherein:

the mixed-element-combination instruction specifies at least one first element predicate register, each first predicate element in the first element predicate register corresponding to a set of N first elements of the set of first elements; and the processing circuitry is configured, when performing the mixed-element-combination operation and when a given first predicate element corresponding to the given set of N first elements has a predetermined value, to exclude performing the at least one arithmetic operation for each first element in the given set of N first elements.

11. The apparatus of claim 3, wherein:

the mixed-element-combination instruction specifies at least one second element predicate register, each second predicate element in the second element predicate register corresponding to a set of N second elements of the set of second elements; and the processing circuitry is configured, when performing the mixed-element-combination operation and when a given second predicate element corresponding to a given set of N second elements has a predetermined value, to exclude performing the at least one arithmetic operation for each second element in the given set of N second elements.

12. The apparatus of claim 1, wherein:

the instruction decoder circuitry is responsive to a second instruction encoding of the mixed-element-combination instruction specifying the element information as an index operand identifying a set of locations in the one or more second architectural registers; and the processing circuitry is configured to select, as the set of second elements, elements from the one or more second architectural registers identified in the index operand.

13. The apparatus of claim 12, wherein:

the index operand identifies P elements in the one or more second architectural registers, wherein P is an integer greater than 1; and the processing circuitry is responsive to the second instruction encoding to perform the mixed-element-combination operation for a plurality of different sets of P elements from the one or more first architectural registers and the P elements.

14. The apparatus of claim 13, wherein for the second instruction encoding, the mixed-element-combination operation performed for each of the plurality of different sets generates a corresponding result element in a result vector.

15. The apparatus of claim 12, wherein for the second instruction encoding, the one or more first architectural registers comprises a plurality of first architectural registers.

16. The apparatus of claim 12, wherein for the second instruction encoding, the one or more second architectural registers comprise a single architectural register.

17. The apparatus of claim 1, wherein at least one of:

the at least one arithmetic operation comprises a multiplication; and/or combining the set of intermediate results comprises summing the intermediate results.

18. The apparatus of claim 1, wherein the processing circuitry is configured, when performing the mixed-element-combination operation to store the results element to a results architectural register.

19. A method of operating an apparatus comprising instruction decoder circuitry configured to decode program instructions, and processing circuitry configured to perform data processing in response to the instructions decoded by the instruction decoder, the method comprising:

with the instruction decoder circuitry in response to a mixed-element-combination instruction specifying one or more first architectural registers and one or more second architectural registers, to trigger the processing circuitry to perform a mixed-element-combination operation, the mixed-element-combination instruction encoding element information identifying a set of elements in the one or more second architectural registers;

with the processing circuitry:

performing at least one arithmetic operation to combine each first element of a set of first elements from contiguous positions in the one or more first architectural registers with a corresponding second element of a set of second elements selected from the one or more second architectural registers according to the element information to generate a set of intermediate result elements; and combining the set of intermediate result elements to generate a result element, wherein a first element size of each first element of the set of first elements is different to a second element size of each second element of the set of second elements.

20. A computer program for controlling a host data processing apparatus to provide an instruction execution environment, the computer program comprising:

instruction decoder program logic configured to decode program instructions;

processing program logic configured to perform data processing in response to the instructions decoded by the instruction decoder program logic;

wherein:

the instruction decoder program logic is responsive to a mixed-element-combination instruction specifying one or more first storage structures simulating one or more first architectural registers and one or more second storage structures simulating one or more second architectural registers, to trigger the processing program logic to perform a mixed-element-combination operation, the mixed-element-combination instruction encoding element information identifying a set of elements in the one or more second storage structures;

the processing program logic is configured, when performing the mixed-element-combination operation:

to perform at least one arithmetic operation to combine each first element of a set of first elements from contiguous positions in the one or more first storage structures with a corresponding second element of a set of second elements selected from the one or more second storage structures according to the element information to generate a set of intermediate result elements; and to combine the set of intermediate result elements to generate a result element; and a first element size of each first element of the set of first elements is different to a second element size of each second element of the set of second elements.

* * * * *